United States Patent
Kawashita et al.

(10) Patent No.: US 9,890,810 B2
(45) Date of Patent: Feb. 13, 2018

(54) SQUEEZE FILM DAMPER, BEARING UNIT, AND TURBINE

(71) Applicant: MITSUBISHI HEAVY INDUSTRIES, LTD., Tokyo (JP)

(72) Inventors: Rimpei Kawashita, Tokyo (JP); Kenichi Fujikawa, Tokyo (JP); Hideaki Sugishita, Tokyo (JP); Naoya Okamoto, Tokyo (JP); Nobuhiro Nagata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/100,059

(22) PCT Filed: Dec. 2, 2014

(86) PCT No.: PCT/JP2014/081864
§ 371 (c)(1),
(2) Date: May 27, 2016

(87) PCT Pub. No.: WO2015/083697
PCT Pub. Date: Jun. 11, 2015

(65) Prior Publication Data
US 2017/0002863 A1 Jan. 5, 2017

(30) Foreign Application Priority Data
Dec. 4, 2013 (JP) ................................. 2013-251380

(51) Int. Cl.
*F16C 27/00* (2006.01)
*F16C 27/02* (2006.01)
*F16F 15/023* (2006.01)

(52) U.S. Cl.
CPC .......... *F16C 27/02* (2013.01); *F16F 15/0237* (2013.01); *F16C 2360/00* (2013.01); *F16C 2360/23* (2013.01)

(58) Field of Classification Search
CPC ..................................................... F16C 27/045
See application file for complete search history.

(56) References Cited

U.S. PATENT DOCUMENTS

| 3,994,541 A | 11/1976 | Geary et al. |
| 4,605,316 A | 8/1986 | Utecht |

(Continued)

FOREIGN PATENT DOCUMENTS

| DE | 26 43 856 | 4/1977 |
| DE | 36 03 604 | 8/1986 |

(Continued)

OTHER PUBLICATIONS

Decision of a Patent Grant dated Feb. 21, 2017 in corresponding Japanese Application No. 2015-551516 (with English translation).

(Continued)

*Primary Examiner* — Thomas R Hannon
(74) *Attorney, Agent, or Firm* — Wenderoth, Lind & Ponack, L.L.P.

(57) ABSTRACT

A squeeze film damper includes a bearing housing as an inner ring disposed around a radially outer side of a bearing which rotatably supports a rotary shaft, an outer ring disposed around a radially outer side of the bearing housing, a squeeze film formed by circulating a viscous fluid through a clearance in a radial direction between the bearing housing and the outer ring, and a coupling pin which couples the bearing housing and the outer ring to each other and is deformable in response to relative displacement in the radial direction between the outer ring and the bearing housing. The coupling pin has stiffness that is higher in a vertical (Continued)

direction than in a horizontal direction in a cross section perpendicular to an axial direction of the rotary shaft.

17 Claims, 13 Drawing Sheets

(56) References Cited

U.S. PATENT DOCUMENTS

| | | | |
|---|---|---|---|
| 4,668,105 A * | 5/1987 | Furukawa | F01D 25/164 384/535 |
| 5,613,781 A | 3/1997 | Kuzdzal et al. | |
| 2006/0008188 A1 | 1/2006 | Nicholas et al. | |

FOREIGN PATENT DOCUMENTS

| | | |
|---|---|---|
| EP | 0 134 749 | 3/1985 |
| EP | 1 985 811 | 10/2008 |
| JP | 60-132029 | 7/1985 |
| JP | 61-133121 | 8/1986 |
| JP | 62-215124 | 9/1987 |
| JP | 63-64922 | 4/1988 |
| JP | 11-504417 | 4/1999 |
| JP | 2007-093007 | 4/2007 |
| JP | 2008-138779 | 6/2008 |
| JP | 4963916 | 6/2012 |
| WO | 2012/071563 | 5/2012 |

OTHER PUBLICATIONS

International Search Report dated Mar. 17, 2015 in International Application No. PCT/JP2014/081864.
English translation of Written Opinion of the International Searching Authority dated Mar. 17, 2015 in corresponding International Application No. PCT/JP2014/081864.
The First Office Action dated May 27, 2017 in corresponding Chinese Application No. 201480065340.0 (with English translation).
Extended European Search Report dated Jul. 7, 2017 in corresponding European Application No. 14867562.2.

* cited by examiner

SQUEEZE FILM DAMPER, BEARING UNIT, AND TURBINE

FIELD

The present invention relates to a squeeze film damper that includes a squeeze film formed in a clearance between an inner ring and an outer ring, a bearing unit, and a turbine.

BACKGROUND

There has been conventionally known a bearing support structure that forms an elastic vibration control structure around a bearing (refer to Patent Literature 1, for example). The bearing support structure is provided with an outer housing which surrounds a bearing support body and includes a squeeze film ring formed in a clearance between the radially outer face of the bearing support body and the radially inner face of the outer housing.

CITATION LIST

Patent Literature

Patent Literature 1: Japanese Patent No. 4963916

SUMMARY

Technical Problem

When a rotary shaft rotates, vibration caused by the rotation and natural vibration of a rotary component including the rotary shaft and the bearing are generated around the rotary shaft. The rotational vibration has a frequency (rotational frequency) corresponding to the number of rotations of the rotary shaft. On the other hand, the natural vibration is a low-frequency vibration whose frequency (natural frequency) is lower than the rotational frequency. A squeeze film damper is disposed around the bearing of the rotary shaft to reduce these vibrations.

In this case, the self-weight of the rotary component including the rotary shaft and the bearing and a static load caused by steam are applied mainly to the lower side in the vertical direction of the squeeze film damper. Accordingly, the outer housing which serves as an outer ring and the bearing support body which serves as an inner ring may be brought into contact with each other due to a narrowed clearance therebetween. In order to prevent such a situation, the outer ring and the inner ring are coupled to each other with a rod-like coupling member to maintain the clearance between the outer ring and the inner ring. On the other hand, the size of the clearance between the outer ring and the inner ring is required to vary in response to a dynamic load so as to function as a damper. Thus, the coupling member has stiffness that allows deformation of the clearance between the outer ring and the inner ring while maintaining the clearance so as to prevent contact between the outer ring and the inner ring in response to a static load.

However, with increases in the length and the size of a shaft system and in output in recent years, the self-weight and a steam power increase. Thus, it is necessary to design a coupling member having a higher stiffness. However, the higher stiffness makes it difficult for the clearance to vary in response to a dynamic load and difficult to obtain a damper effect by the squeeze film. As a result, it is difficult to reduce the vibrations generated around the rotary shaft.

In view of the above, it is an object of the present invention to provide a squeeze film damper, a bearing unit, and a turbine that enable a clearance between an inner ring and an outer ring to be appropriately maintained to reduce a deterioration in a damper performance by a squeeze film.

Solution to Problem

A squeeze film damper according to the present invention comprises an inner ring disposed around a radially outer side of a bearing, the bearing rotatably supporting a rotary shaft; an outer ring disposed around a radially outer side of the inner ring; a squeeze film formed by circulating a viscous fluid through a clearance in a radial direction between the inner ring and the outer ring; and a coupling member configured to couple the inner ring and the outer ring to each other, the coupling member being deformable in response to relative displacement in the radial direction between the outer ring and the inner ring, wherein the coupling member has stiffness that is higher in a load direction than in a perpendicular direction perpendicular to the load direction in a cross section perpendicular to an axial direction.

This configuration enables the stiffness of the coupling member to be increased in the load direction even when the coupling member is long. Thus, since the clearance between the inner ring and the outer ring can be appropriately maintained in the load direction, it is possible to reduce a deterioration in a damper effect by the squeeze film that may be caused by a narrowed clearance. On the other hand, the stiffness of the coupling member can be made lower in the perpendicular direction than in the load direction. In this case, in the perpendicular direction, since the clearance between the inner ring and the outer ring is not narrowed by a load, the clearance between the inner ring and the outer ring can be appropriately maintained. Further, the clearance between the inner ring and the outer ring can be more easily deformed in the perpendicular direction than in the load direction. Thus, the damper effect by the squeeze film can be appropriately exhibited in the perpendicular direction. The bearing is not particularly limited to any bearing, and may be a tilting pad bearing, a slide bearing, or a rolling bearing. The viscous fluid is not particularly limited to any fluid, and may be air or a lubricating oil. The load direction is not particularly limited to any direction, and may be the vertical direction. The perpendicular direction is not particularly limited to any direction, and may be the horizontal direction.

In this case, preferably, the inner ring and the outer ring each have overlap parts overlapping each other in the axial direction, the coupling member is disposed along the axial direction and couples the overlap part of the inner ring and the overlap part of the outer ring to each other, a part of the coupling member serves as a deformable damper part deformable in response to the displacement, and the deformable damper part has stiffness that is higher in a load direction than in a perpendicular direction perpendicular to the load direction in a cross section perpendicular to an axial direction.

This configuration enables the stiffness of the deformable damper part of the coupling member to be higher in the load direction than in the perpendicular direction in the cross section perpendicular to the axial direction when the coupling member is arranged in the axial direction. Thus, appropriate stiffness corresponding to the arrangement of the coupling member can be obtained.

In this case, preferably, the deformable damper part has a cross-sectional shape that is long in the load direction and short in the perpendicular direction in the cross section.

This configuration enables the stiffness of the deformable damper part of the coupling member to be higher in the load direction than in the perpendicular direction with the cross-sectional shape of the deformable damper part that is long in the load direction and short in the perpendicular direction. The cross-sectional shape that is long in the load direction and short in the perpendicular direction is not particularly limited to any shape, and may be, for example, a rectangular shape, an elliptical shape, or an oval shape.

In this case, preferably, the overlap part of the inner ring includes an inner coupling hole into which the coupling member is inserted, the overlap part of the outer ring includes an outer coupling hole into which the coupling member is inserted, the coupling member includes an inner fitting part fitted with the inner coupling hole, an outer fitting part fitted with the outer coupling hole, and the deformable damper part formed between the inner fitting part and the outer fitting part and housed in the outer coupling hole, and the deformable damper part abuts against an inner face of the outer coupling hole at a side in the load direction.

This configuration enables the deformation in the load direction of the deformable damper part to be restricted by the abutment of the deformable damper part of the coupling member against the inner face in the load direction of the outer coupling hole. Thus, it is possible to restrict the deformation of the clearance between the inner ring and the outer ring caused by a load and more appropriately maintain the clearance.

In this case, preferably, the inner ring and the outer ring each have overlap parts overlapping each other in a load direction, the coupling member is disposed along the load direction and couples the overlap part of the inner ring and the overlap part of the outer ring to each other, and a part of the coupling member serves as a deformable damper part deformable in response to the displacement.

This configuration enables the length of the coupling member to be increased in the load direction by arranging the coupling member along the load direction. Accordingly, the stiffness of the deformable damper part of the coupling member can be made higher in the load direction than in the perpendicular direction. Thus, appropriate stiffness corresponding to the arrangement of the coupling member can be obtained merely by changing the arrangement of the coupling member without changing the shape of the coupling member.

In this case, preferably, a plurality of the coupling members are disposed along an axial direction at predetermined intervals in a circumferential direction of the rotary shaft, and the intervals in the circumferential direction of the plurality of coupling members are short on both sides in the load direction and long on both sides in the perpendicular direction.

With this configuration, since the intervals between the coupling members are narrowed on both sides in the load direction, and, on the other hand, expanded on both sides in the perpendicular direction, the stiffness of the plurality of coupling members can be made higher in the load direction than in the perpendicular direction. Thus, appropriate stiffness can be obtained by the arrangement of the plurality of coupling members.

Another squeeze film damper according to the present invention comprises an inner ring disposed around a radially outer side of a bearing, the bearing rotatably supporting a rotary shaft; an outer ring disposed around a radially outer side of the inner ring; a squeeze film formed by circulating a viscous fluid through a clearance in a radial direction between the inner ring and the outer ring; and a coupling member configured to couple the inner ring and the outer ring to each other, the coupling member being deformable in response to relative displacement in the radial direction between the outer ring and the inner ring, wherein the inner ring and the outer ring are arranged in contact with each other at a load direction side in a cross section perpendicular to an axial direction.

With this configuration, even when the coupling member is long, the contact between the inner ring and the outer ring makes it possible to restrict the deformation in the load direction and increase the stiffness in the load direction. On the other hand, the stiffness is lower in the perpendicular direction than in the load direction. In this case, in the perpendicular direction, since the clearance between the inner ring and the outer ring is not narrowed by a load, the clearance between the inner ring and the outer ring can be appropriately maintained. Thus, the damper effect by the squeeze film can be appropriately exhibited in the perpendicular direction.

In this case, preferably, the outer ring has an inner peripheral face facing the inner ring, the inner peripheral face being in contact with an outer peripheral face of the inner ring at the load direction side, and the inner peripheral face of the outer ring has a curvature radius that is larger in a region located at the load direction side than in a region other than the load direction side in a cross section perpendicular to an axial direction.

This configuration enables contact between the outer ring and the inner ring by increasing the curvature radius of the inner peripheral face of the outer ring in the region on the load direction side. When the outer ring and the inner ring relatively move in the perpendicular direction, the inner ring moves along the inner peripheral face of the outer ring. Thus, it is possible to vary the clearance between the inner ring and the outer ring in the perpendicular direction and appropriately exhibit the damper effect.

Another squeeze film damper according to the present invention comprises an inner ring disposed around a radially outer side of a bearing, the bearing rotatably supporting a rotary shaft; an outer ring disposed around a radially outer side of the inner ring; a squeeze film formed by circulating a viscous fluid through a clearance in a radial direction between the inner ring and the outer ring; a coupling member configured to couple the inner ring and the outer ring to each other, the coupling member being deformable in response to relative displacement in the radial direction between the outer ring and the inner ring; and a spacer disposed between the inner ring and the outer ring at a load direction side, the spacer being in contact with the outer ring and the outer ring.

With this configuration, even when the coupling member is long, the contact between the inner ring and the outer ring with the spacer interposed therebetween makes it possible to restrict the deformation in the load direction of the coupling member and increase the stiffness in the load direction. On the other hand, the stiffness is lower in the perpendicular direction than in the load direction. In this case, in the perpendicular direction, since the clearance between the inner ring and the outer ring is not narrowed by a load, the clearance between the inner ring and the outer ring can be appropriately maintained. Thus, the damper effect by the squeeze film can be appropriately exhibited in the perpendicular direction.

In this case, preferably, the spacer is laid on an inner peripheral face of the outer ring, the inner peripheral face facing the inner ring.

This configuration enables easy installation of the spacer by laying the spacer on the inner peripheral face of the outer ring. Thus, the processing cost can be reduced.

In this case, preferably, the spacer penetrates the outer ring from a radially outer side through a radially inner side.

This configuration enables easy installation of the spacer by disposing the spacer in a manner to penetrate the outer ring. Thus, the processing cost can be reduced.

In this case, preferably, a plurality of the coupling members are disposed along the axial direction at predetermined intervals in a circumferential direction of the rotary shaft, and the number of the plurality of coupling members is smaller at the load direction side than at an opposite side of the load direction side.

With this configuration, since the inner ring and the outer ring are in contact with each other at the load direction side, the load of the inner ring is supported by the outer ring. Thus, since the stiffness at the load direction side can be increased, the number of coupling members disposed at the load direction side can be reduced. Thus, since the number of coupling members can be reduced, the processing cost can be reduced.

Another squeeze film damper according to the present invention comprises an inner ring disposed around a radially outer side of a bearing, the bearing rotatably supporting a rotary shaft; an outer ring disposed around a radially outer side of the inner ring; a squeeze film formed by circulating a viscous fluid through a clearance in a radial direction between the inner ring and the outer ring; and a coupling member configured to couple the inner ring and the outer ring to each other, the coupling member being deformable in response to relative displacement in the radial direction between the outer ring and the inner ring, wherein the clearance between the inner ring and the outer ring is larger in a load direction than in a perpendicular direction perpendicular to the load direction in a cross section perpendicular to an axial direction.

With this configuration, even when the coupling member is long, the clearance between the inner ring and the outer ring in the load direction is not narrowed. Thus, the clearance between the inner ring and the outer ring can be appropriately maintained in the load direction, and a deterioration the damper effect by the squeeze film can be reduced. On the other hand, in the perpendicular direction, since the clearance between the inner ring and the outer ring is not narrowed by a load, the clearance between the inner ring and the outer ring can be appropriately maintained. Thus, the damper effect by the squeeze film can be appropriately exhibited in the perpendicular direction.

In this case, preferably, the outer ring includes grooves formed in a recessed form on an inner peripheral face facing the inner ring, and the grooves are formed on both sides in the load direction in the cross section perpendicular to the axial direction.

With this configuration, forming the grooves makes it possible to easily ensure the clearance between the inner ring and the outer ring in the load direction and reduce the processing cost.

Another squeeze film damper according to the present invention comprises an inner ring disposed around a radially outer side of a bearing, the bearing rotatably supporting a rotary shaft; an outer ring disposed around a radially outer side of the inner ring; a squeeze film formed by circulating a viscous fluid through a clearance in a radial direction between the inner ring and the outer ring; and a coupling member configured to couple the inner ring and the outer ring to each other, the coupling member being deformable in response to relative displacement in the radial direction between the outer ring and the inner ring, wherein the inner ring has stiffness that is higher in a load direction than in a perpendicular direction perpendicular to the load direction in a cross section perpendicular to an axial direction.

With this configuration, the inner ring is more resistant to deformation in the load direction than in the perpendicular direction. Thus, in the load direction, since the clearance between the inner ring and the outer ring can be appropriately maintained, a deterioration in the damper effect by the squeeze film can be reduced. Further, in the perpendicular direction, since the clearance between the inner ring and the outer ring is not narrowed by a load, the clearance between the inner ring and the outer ring can be appropriately maintained. Thus, the damper effect by the squeeze film can be appropriately exhibited in the perpendicular direction.

In this case, preferably, the inner ring includes cut-away parts formed on both sides in the load direction.

With this configuration, forming the cut-away parts on both sides in the load direction of the inner ring makes it possible to easily reduce the stiffness of the inner ring in the perpendicular direction and relatively increase the stiffness of the inner ring in the load direction. Thus, the processing cost can be reduced.

In this case, preferably, the bearing is a tilting pad bearing including a plurality of pads disposed around the rotary shaft at predetermined intervals, and a bearing housing configured to hold the plurality of pads, the bearing housing being disposed around radially outer sides of the plurality of pads, and the bearing housing and the inner ring are integrated with each other.

With this configuration, since the bearing housing and the inner ring can be integrated with each other, it is possible to reduce the number of components and reduce the manufacturing cost.

A bearing unit according to the present invention comprises a bearing configured to rotatably support a rotary shaft; and the squeeze film damper described above and disposed around a radially outer side of the bearing.

With this configuration, even when a load is applied to the squeeze film damper, the vibrations of the rotary shaft and the bearing can be appropriately reduced by the damper effect of the squeeze film.

A turbine according to the present invention comprises the bearing unit described above; and the rotary shaft rotatably supported by the bearing unit.

With this configuration, it is possible to appropriately rotate the rotary shaft while reducing the vibration of the rotary shaft by the bearing unit.

DESCRIPTION OF EMBODIMENTS

Hereinbelow, embodiments according to the present invention will be described in detail with reference to the drawings. It is to be noted that the present invention is not limited by the embodiments. Elements in the embodiments described below include elements easily replaceable by those skilled in the art or substantially the same elements.

First Embodiment

Figure 1:
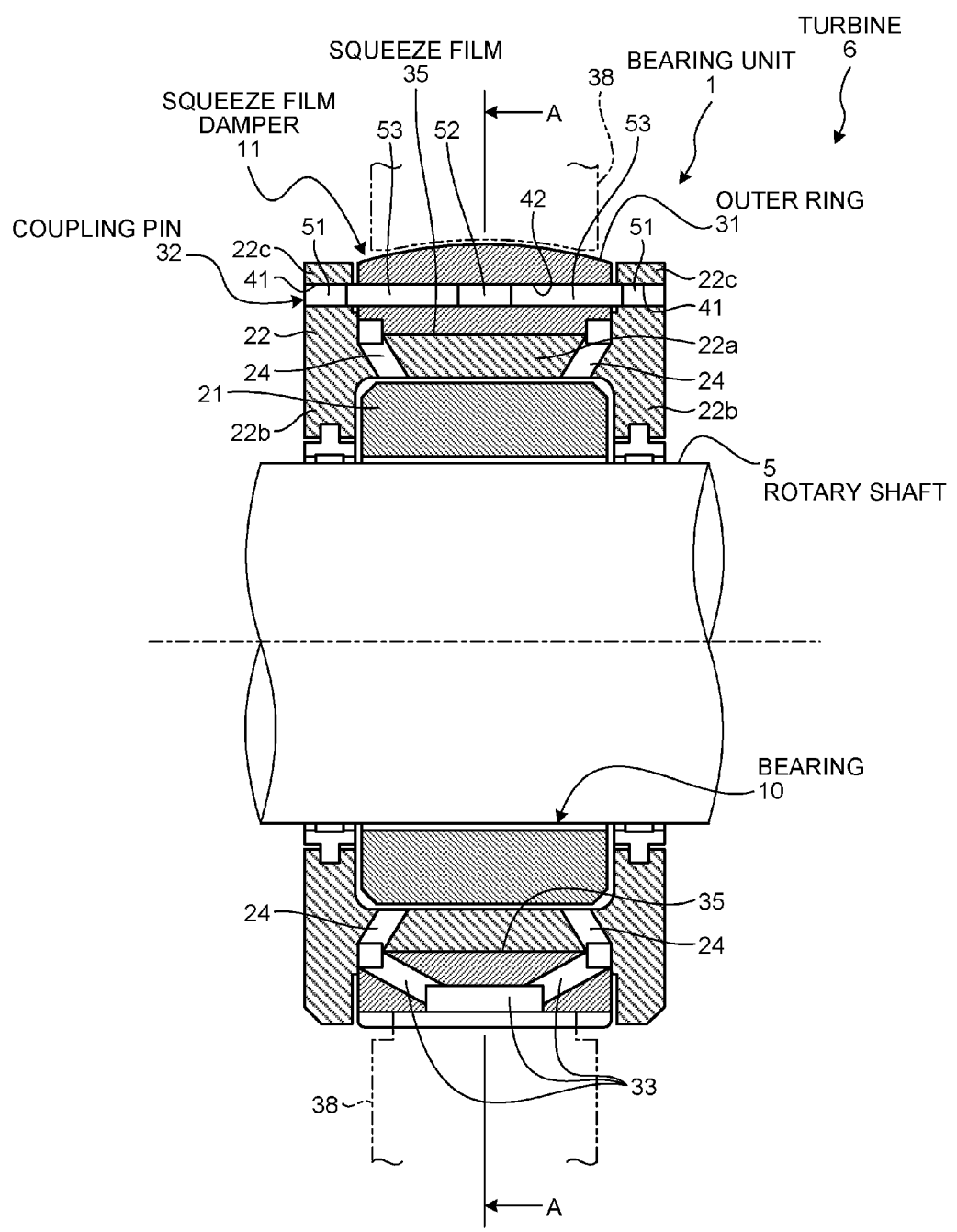
FIG. 1 is a sectional view of a bearing unit provided with a squeeze film damper according to a first embodiment, the view being taken along an axial direction.
Figure 2:
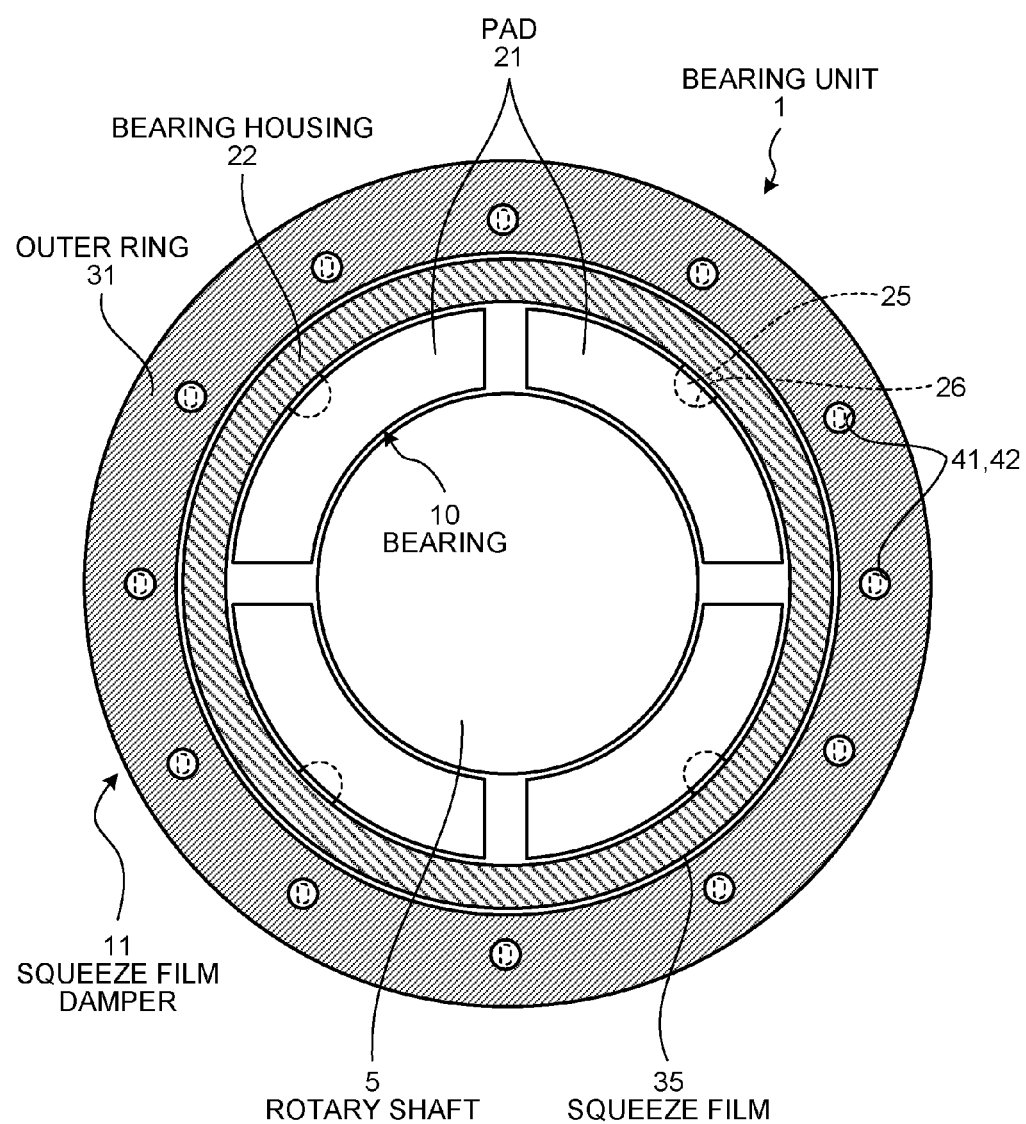
FIG. 2 is an A-A sectional view of the bearing unit provided with the squeeze film damper according to the first embodiment, the view being taken along a plane perpendicular to the axial direction.
Figure 3:
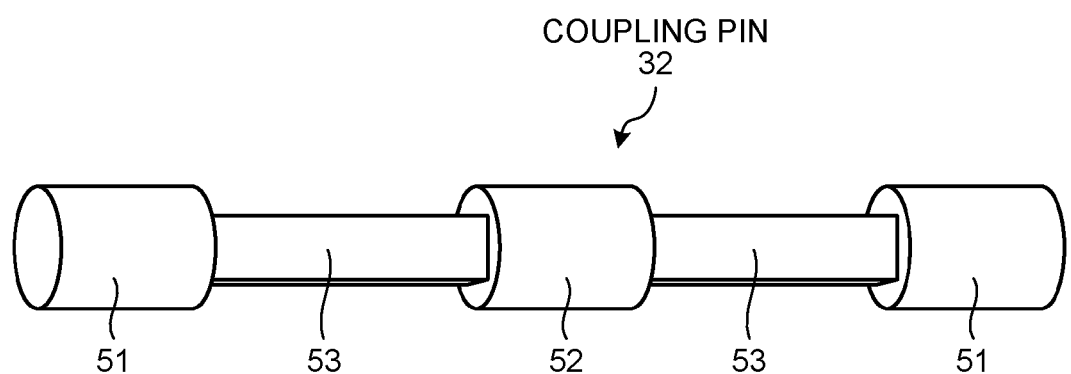
FIG. 3 is a perspective view schematically illustrating a coupling pin of the squeeze film damper according to the first embodiment.
Figure 4:
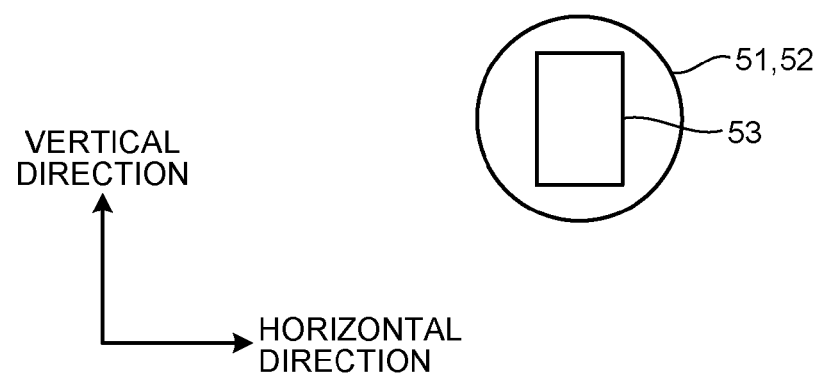
FIG. 4 is a sectional view of the coupling pin of the squeeze film damper according to the first embodiment, the view being taken along a plane perpendicular to an axial direction.
Figure 5:
FIG. 5 is a sectional view of a coupling pin of a squeeze film damper according to a first modification, the view being taken along a plane perpendicular to an axial direction.

FIG. 1 is a sectional view of a bearing unit provided with a squeeze film damper according to a first embodiment, the view being taken along an axial direction. FIG. 2 is a sectional view of the bearing unit provided with the squeeze film damper according to the first embodiment, the view being taken along a plane perpendicular to the axial direction, specifically, taken along line A-A of FIG. 1. FIG. 3 is a perspective view schematically illustrating a coupling pin of the squeeze film damper according to the first embodiment. FIG. 4 is a sectional view of the coupling pin of the squeeze film damper according to the first embodiment, the view being taken along a plane perpendicular to an axial direction. FIG. 5 is a sectional view of a coupling pin of a squeeze film damper according to a first modification, the view being taken along a plane perpendicular to an axial direction.

As illustrated in FIG. 1, a squeeze film damper 11 according to the first embodiment is disposed on a bearing unit 1 and integrated with a bearing 10 which rotatably supports a rotary shaft 5. That is, the bearing unit 1 includes the bearing 10 which rotatably supports the rotary shaft 5 and the squeeze film damper 11 which supports the bearing 10, the bearing 10 and the squeeze film damper 11 being integrated with each other.

The rotary shaft 5 is a turbine rotor which is disposed on a turbine 6 and arranged with an axial direction thereof aligned with the horizontal direction. When the rotary shaft 5 rotates, vibration caused by the rotation and natural vibration of a rotary component including the rotary shaft 5 and the bearing 10 are generated around the rotary shaft 5. In this case, the natural vibration is a low-frequency vibration whose frequency (natural frequency) is lower than the frequency of the rotational vibration (rotational frequency). The bearing 10 rotatably supports the rotary shaft 5, and the squeeze film damper 11 controls the vibration of the rotary shaft 5. The turbine 6 is not particularly limited to any turbine, and may be a steam turbine or a gas turbine.

The bearing 10 is, for example, a tilting pad bearing, and includes a plurality of pads 21 disposed around the rotary shaft 5 and a bearing housing 22 disposed around the pads 21.

The plurality of pads 21 are disposed on the outer periphery of the rotary shaft 5 at predetermined intervals in the circumferential direction. In the first embodiment, for example, four pads 21 are provided. Each of the pads 21 is formed in a circular arc shape, and the inner peripheral face thereof forms a curved plane facing the outer peripheral face of the rotary shaft 5.

The housing 22 is annularly disposed on the outer peripheries of the pads 21 which are arranged in the circumferential direction. As illustrated in FIG. 1, the housing 22 includes an annular part 22a which is located on the outer peripheral sides of the pads 21, a pair of inner peripheral flanges 22b which are formed on both axial sides of the annular part 22a, and a pair of outer peripheral flanges 22c which are formed on both axial sides of the annular part 22a.

The pair of inner peripheral flanges 22b are formed on both axial sides of the annular part 22a and project inward in the radial direction. The pads 21 are disposed between the pair of inner peripheral flanges 22b in the axial direction, and the pair of inner peripheral flanges 22b restrict axial movement of the pads 21 to the axial direction.

The pair of outer peripheral flanges 22c are formed on both axial sides of the annular part 22a and project outward in the radial direction so that an outer ring 31 of the squeeze film damper 11 (described below) can be housed inside thereof. That is, the pair of outer peripheral flanges 22c constitute an overlap part which overlaps the outer ring 31 of the squeeze film damper 11 (described below) in the axial direction.

The annular part 22a includes a first oil passage 24 which is formed for supplying a lubricating oil from the radially outer side toward the pads 21 located on the radially inner side. Thus, the lubricating oil flows into the first oil passage 24 from the outer peripheral face of the annular part 22a, then flows toward the inner peripheral face of the annular part 22a, and then flows out to the inner peripheral side of the annular part 22a. Since the pads 21 are disposed on the inner peripheral side of the annular part 22a, the lubricating oil is filled around the pads 21 and also filled between the rotary shaft 5 and the pads 21.

As illustrated in FIG. 2, a plurality of pivots 25 for positioning the respective pads 21 are formed on the inner peripheral face of the annular part 22a, and the number of the pivots 25 is the same as the number of the pads 21 to be provided. The pivots 25 are projections which project inward in the radial direction from the inner peripheral face of the annular part 22a. On the other hand, an engagement hole 26 which is engaged with the corresponding pivot 25 is formed in a recessed form on the outer peripheral face located on the radially outer side of each of the pads 21. Thus, each of the pads 21 is positioned with respect to the bearing housing 22 by the engagement of the engagement hole 26 of the pad 21 with the corresponding pivot 25 of the annular part 22a.

The bearing 10 configured in this manner rotatably supports the rotary shaft 5 with a lubricating oil existing between the rotary shaft 5 and the pads 21.

The squeeze film damper 11 which is disposed around the radially outer side of the bearing 10 includes an inner ring, the outer ring 31, and a coupling pin (coupling member) 32 which couples the inner ring and the outer ring 31 to each other. Since the inner ring is integrated with the bearing housing 22, a part of the bearing housing 22 functions as the inner ring.

The outer ring 31 is disposed between the pair of outer peripheral flanges 22c which are formed on both axial sides of the annular part 22a, and axial movement of the outer ring 31 is restricted. The outer ring 31 is formed in an annular shape and overlaps the pair of outer peripheral flanges 22c in the axial direction. The outer peripheral face of the outer ring 31 is supported by a fixation member 38.

The inner peripheral face of the outer ring 31 faces the outer peripheral face of the annular part 22a of the bearing housing 22. The outer ring 31 includes a second oil passage 33 which is formed for supplying a lubricating oil from the radially outer side toward the annular part 22a of the bearing housing 22 located on the radially inner side. Thus, the lubricating oil flows into the second oil passage 33 from the outer peripheral face of the outer ring 31, then flows toward the inner peripheral face of the outer ring 31, and then flows out to the outer peripheral side of the annular part 22a. Thus, the lubricating oil as a viscous fluid existing between the outer ring 31 and the annular part 22a forms an annular squeeze film 35. The lubricating oil flowing on the outer peripheral side of the annular part 22a flows into the first oil passage 24.

The squeeze film 35 formed in an annular shape exhibits a damper effect with respect to relative displacement in the radial direction between the outer ring 31 and the bearing housing 22 to reduce the vibration generated around the rotary shaft 5.

The coupling pin 32 is a member that couples the bearing housing 22 and the outer ring 31 to each other while forming a clearance for circulating a lubricating material between the outer ring 31 and the annular part 22a. The coupling pin 32 is formed in a rod-like shape elongated in a longitudinal direction and arranged with the longitudinal direction aligned with the axial direction of the rotary shaft 5.

An inner coupling hole 41 for inserting the coupling pin 32 axially penetrates each of the outer peripheral flanges 22c of the bearing housing 22. An outer coupling hole 42 for inserting the coupling pin 32 axially penetrates the outer ring 31. The inner coupling hole 41 and the outer coupling hole 42 axially overlap each other, and have circular cross sections. The inner coupling hole 41 and the outer coupling hole 42 have the same inside diameter.

As illustrated in FIG. 2, a plurality of inner coupling holes 41, for example, twelve inner coupling holes 41 in the first embodiment are formed at predetermined intervals along the circumferential direction of the outer ring 31, and a plurality of outer coupling holes 42, for example, twelve outer coupling holes 42 in the first embodiment are formed at predetermined intervals along the circumferential direction of the outer ring 31.

Again referring to FIG. 1, the rod-like coupling pin 32 is inserted into the inner coupling hole 41 of one of the outer peripheral flanges 22c, then inserted into the outer coupling hole 42 of the outer ring 31, and then inserted into the inner coupling hole 41 of the other outer peripheral flange 22c. The coupling pin 32 includes a pair of inner fitting parts 51 which are formed on both longitudinal ends, an outer fitting part 52 which is formed between the pair of inner fitting parts 51, and a pair of deformable damper parts 53 each of which is formed between the corresponding inner fitting part 51 and the outer fitting part 52.

As illustrated in FIGS. 1 and 3, the pair of inner fitting parts 51 are fitted with the pair of inner coupling holes 41. Thus, each of the inner fitting parts 51 is formed in a cylindrical shape having a diameter substantially equal to the inside diameter of each of the inner coupling holes 41 so as to be fitted with each of the inner coupling holes 41 having a circular cross section.

The outer fitting part 52 is fitted with the outer coupling hole 42. Thus, the outer fitting part 52 is formed in a cylindrical shape having a diameter substantially equal to the inside diameter of the outer coupling hole 42 so as to be fitted with the outer coupling hole 42 having a circular cross section similarly to the inner fitting parts 51. The axial length of the outer fitting part 52 is shorter than the axial length of the outer coupling hole 42, and the outer fitting part 52 is located on the axial center of the outer coupling hole 42.

The pair of deformable damper parts 53 are formed between one of the inner fitting parts 51 and the outer fitting part 52 and between the other inner fitting part 51 and the outer fitting part 52, and inserted into the outer coupling hole 42. Each of the deformable damper parts 53 is deformable in response to relative deformation in the radial direction between the outer ring 31 and the bearing housing 22.

As illustrated in FIGS. 3 and 4, in each of the deformable damper parts 53, a cross section taken along a plane perpendicular to the longitudinal direction (axial direction) has a rectangular shape. The cross section of the deformable damper part 53 is smaller than the cross section of the inner fitting part 51 and the cross section of the outer fitting part 52, and has a size that can fit within the cross section of the inner fitting part 51 and the cross section of the outer fitting part 52. In this case, the long side of the rectangular cross section of the deformable damper part 53 is aligned with the vertical direction, and the short side of the rectangular cross section is aligned with the horizontal direction. Since the deformable damper part 53 has such a rectangular cross-sectional shape, the stiffness thereof is higher in the vertical direction than in the horizontal direction. Thus, the coupling pin 32 is resistant to warping even when a load is applied to the coupling pin 32 in the vertical direction.

As described above, the configuration of the first embodiment enables the stiffness of the coupling pin 32 to be increased in the vertical direction even when the coupling pin 32 is long. Thus, since the clearance between the outer ring 31 and the annular part 22a of the bearing housing 22 can be appropriately maintained in the vertical direction as a load direction, it is possible to reduce a deterioration in a damper effect by the squeeze film 35 that may be caused by a narrowed clearance. On the other hand, the stiffness of the coupling pin 32 can be made lower in the horizontal direction than in the vertical direction. In this case, in the horizontal direction, since the clearance between the outer ring 31 and the annular part 22a of the bearing housing 22 is not narrowed by a load, the clearance between the outer ring 31 and the annular part 22a of the bearing housing 22 can be appropriately maintained. Further, the clearance between the outer ring 31 and the annular part 22a of the bearing housing 22 can be more easily deformed in the horizontal direction than in the vertical direction. Thus, the damper effect by the squeeze film 35 can be appropriately exhibited in the horizontal direction.

The configuration of the first embodiment enables the stiffness of the deformable damper part 53 of the coupling pin 32 to be higher in the vertical direction than in the horizontal direction in the cross section perpendicular to the axial direction when the coupling pin 32 is arranged with the longitudinal direction aligned with the axial direction. Thus, appropriate stiffness corresponding to the arrangement of the coupling pin 32 can be obtained.

The configuration of the first embodiment enables the stiffness to be higher in the vertical direction than in the horizontal direction with the simple structure of the rectangular cross sectional shape of the deformable damper part 53.

The configuration of the first embodiment enables integration between the bearing housing 22 and the inner ring. Thus, it is possible to reduce the number of components and reduce the manufacturing cost of the bearing unit 1.

The configuration of the first embodiment enables the damper effect of the squeeze film 35 to be exhibited even when a load in the vertical direction is applied to the squeeze film damper 11. Thus, it is possible to appropriately rotate the rotary shaft 5 while appropriately reducing the vibration of the rotary shaft 5 by the bearing unit 1.

Although, in the first embodiment, the bearing 10 is a tilting pad bearing, the bearing 10 is not particularly limited to any bearing and may be a slide bearing or a rolling bearing. Although, in the first embodiment, a lubricating oil is used as a viscous fluid, the viscous fluid is not particularly limited to any fluid and may be air.

Although, in the first embodiment, the cross section of the deformable damper part 53 of the coupling pin 32 has a rectangular shape, the cross section of the deformable damper part 53 may have a shape illustrated in FIG. 5. FIG. 5 is a sectional view of a coupling pin of a squeeze film damper according to a first modification, the view being taken along a plane perpendicular to an axial direction. As illustrated in FIG. 5, in the cross-sectional shape of the coupling pin 32 of the first modification, upper and lower sides in the vertical direction are formed in circular arcs, and right and left sides in the horizontal direction are formed in straight lines extending in the vertical direction. In this case, the coupling pin 32 has a cross-sectional shape that is long in the vertical direction and short in the horizontal direction similarly to the first embodiment. Thus, when the coupling pin 32 is arranged with the longitudinal direction aligned with the axial direction, the stiffness of the deformable damper part 53 of the coupling pin 32 can be made higher in the vertical direction than in the horizontal direction in the cross section perpendicular to the axial direction. Thus, appropriate stiffness corresponding to the arrangement of the coupling pin 32 can be obtained.

The cross-sectional shape of the deformable damper part 53 is not limited to the cross-sectional shapes of the first embodiment and the first modification, and may be any shape that is long in the vertical direction (load direction) and short in the horizontal direction, for example, an elliptical shape or an oval shape.

Second Embodiment

Figure 6:
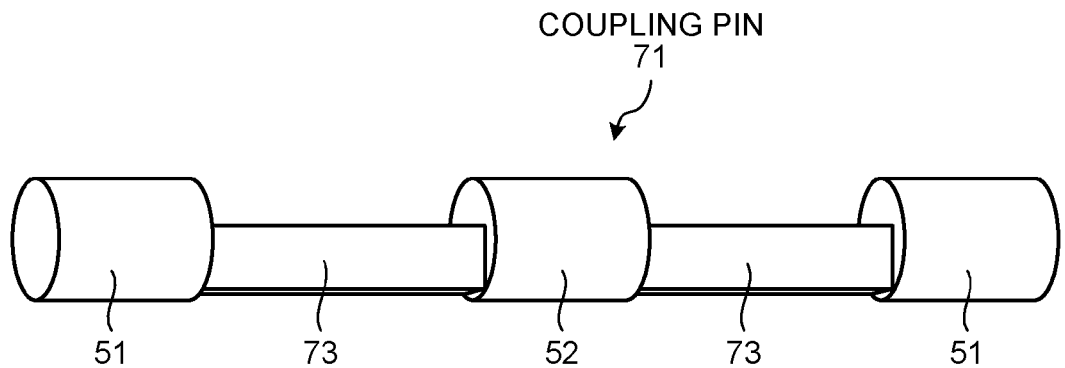
FIG. 6 is a perspective view schematically illustrating a coupling pin of a squeeze film damper according to a second embodiment.
Figure 7:
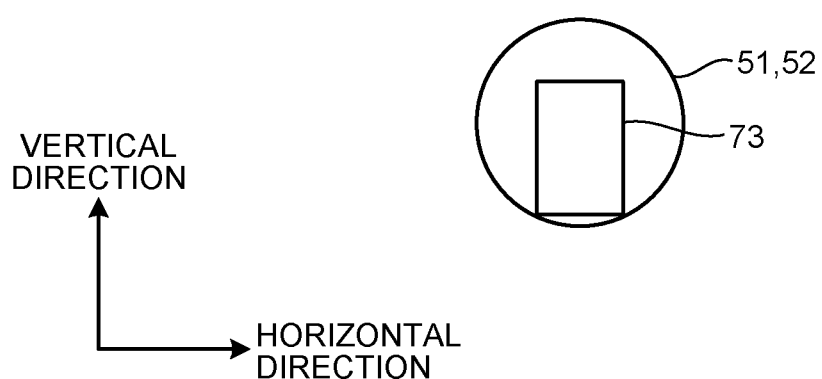
FIG. 7 is a sectional view of the coupling pin of the squeeze film damper according to the second embodiment, the view being taken along a plane perpendicular to an axial direction.

Next, a bearing unit according to a second embodiment will be described with reference to FIGS. 6 and 7. FIG. 6 is a perspective view schematically illustrating a coupling pin of a squeeze film damper according to the second embodiment. FIG. 7 is a sectional view of the coupling pin of the squeeze film damper according to the second embodiment, the view being taken along a plane perpendicular to an axial direction. In the second embodiment, parts different from the first embodiment will be described and parts having the same configuration as the first embodiment will be designated by the same reference signs to avoid overlapping description.

As illustrated in FIGS. 6 and 7, in the bearing unit according to the second embodiment, the position of each deformable damper part 73 of a coupling pin 71 differs from the position of the deformable damper part 53 of the coupling pin 32 in the bearing unit 1 of the first embodiment.

Specifically, in the deformable damper part 73, a cross section taken along a plane perpendicular to the longitudinal direction (axial direction) has a rectangular shape similarly to the first embodiment. In this case, the deformable damper part 73 is arranged in such a manner that a lower part in the vertical direction, more specifically, a lower corner thereof abuts against the lower face of the outer coupling hole 42 into which the deformable damper part 73 is inserted. That is, the deformable damper part 73 of the second embodiment is located at a side that is lower, in the vertical direction, than the deformable damper part 53 of the first embodiment.

As described above, the configuration of the second embodiment enables deformation in a load direction (a vertically downward direction) of the deformable damper part 73 to be restricted by the abutment of the deformable damper part 73 of the coupling pin 71 against the lower face (the inner face on the lower side in the vertical direction) of the outer coupling hole 42. Thus, it is possible to restrict deformation of a clearance between the outer ring 31 and the annular part 22a of the bearing housing 22 caused by a load and more appropriately maintain the clearance.

Figure 8:
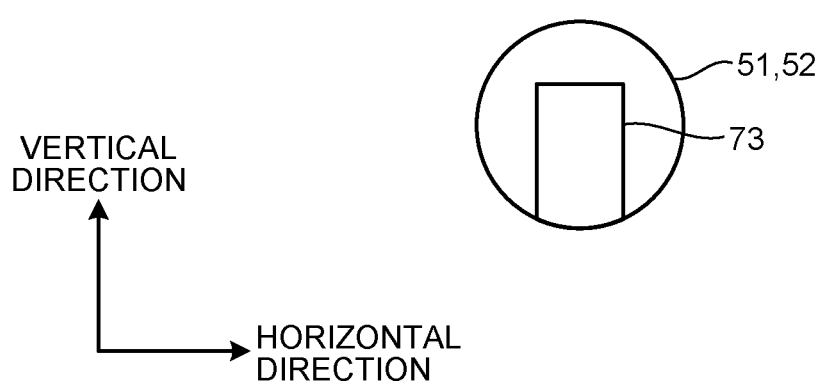
FIG. 8 is a sectional view of a coupling pin of a squeeze film damper according to a second modification, the view being taken along a plane perpendicular to an axial direction.

Although, in the second embodiment, the cross section of the deformable damper part 73 of the coupling pin 71 has a rectangular shape, the cross section of the deformable damper part 73 may have a shape illustrated in FIG. 8. FIG. 8 is a sectional view of a coupling pin of a squeeze film damper according to a second modification, the view being taken along a plane perpendicular to an axial direction. As illustrated in FIG. 8, in the cross-sectional shape of a deformable damper part 73 in the coupling pin 71 of the second modification, the lower short side of the deformable damper part 73 of the second embodiment having a rectangular cross-sectional shape is formed in a circular arc curved along the inner face of the outer coupling hole 42. Thus, it is possible to allow the deformable damper part 73 of the coupling pin 71 to abut against the lower face (the inner face on the lower side in the vertical direction) of the outer coupling hole 42 with a larger contact area. Thus, it is possible to more firmly restrict the deformation in the load direction (the vertically downward direction) of the deformable damper part 73.

The cross-sectional shape of the deformable damper part 73 is not limited to the cross-sectional shapes of the second embodiment and the second modification. The cross-sectional shape of the deformable damper part 73 is not particularly limited to any shape, and may be any shape that enables the deformable damper part 73 of the coupling pin 71 to abut against the lower face of the outer coupling hole 42.

Third Embodiment

Figure 9:
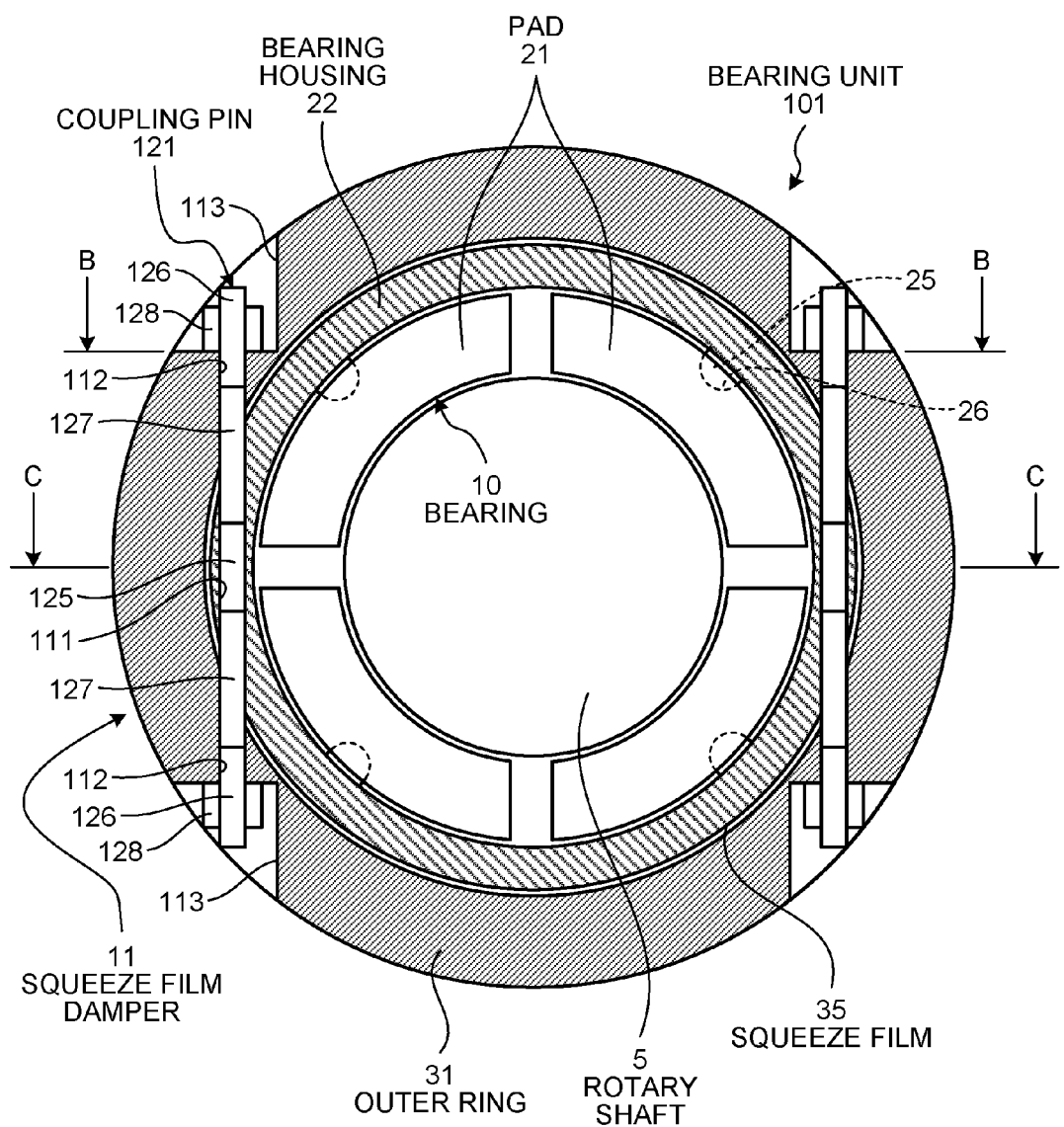
FIG. 9 is a sectional view of a bearing unit provided with a squeeze film damper according to a third embodiment, the view being taken along a plane perpendicular to an axial direction.
Figure 10:
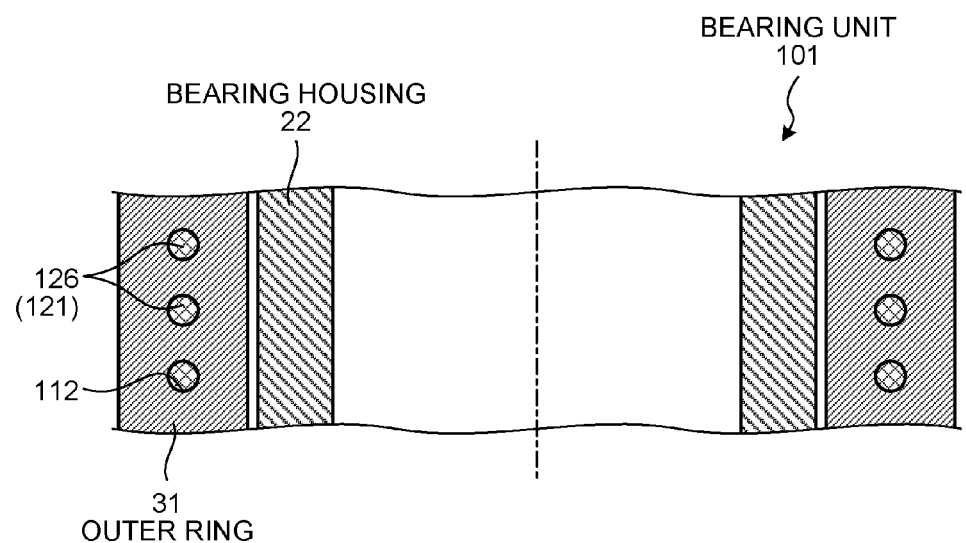
FIG. 10 is a B-B sectional view of the bearing unit provided with the squeeze film damper according to the third embodiment, the view being taken along the axial direction.
Figure 11:
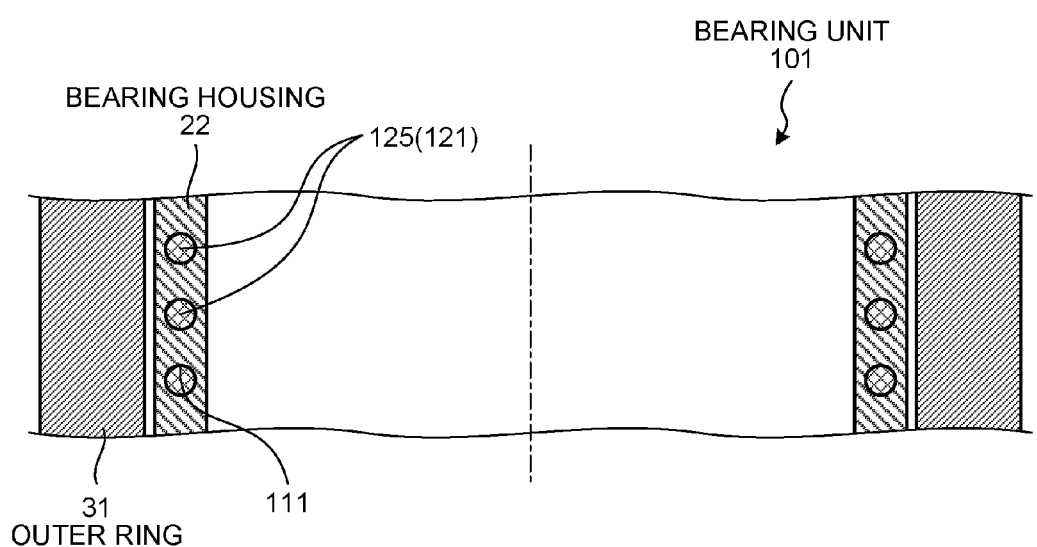
FIG. 11 is a C-C sectional view of the bearing unit provided with the squeeze film damper according to the third embodiment, the view being taken along the axial direction.

Next, a bearing unit 101 according to a third embodiment will be described with reference to FIGS. 9 to 11. FIG. 9 is a sectional view of the bearing unit provided with a squeeze film damper according to the third embodiment, the view being taken along a plane perpendicular to an axial direction. FIG. 10 is a sectional view of the bearing unit provided with the squeeze film damper according to the third embodiment, the view being taken along the axial direction, specifically, taken along line B-B of FIG. 9. FIG. 11 is a sectional view of the bearing unit provided with the squeeze film damper according to the third embodiment, the view being taken along the axial direction, specifically, taken along line C-C of FIG. 9. Also in the third embodiment, parts different from the first and second embodiments will be described and parts having the same configuration as the first and second embodiments will be designated by the same reference signs to avoid overlapping description. Although, in the first and second embodiments, the longitudinal direction of the coupling pins 32, 71 is the same as the axial direction of the rotary shaft 5, the longitudinal direction of a coupling pin 121 is the same as the vertical direction in the third embodiment.

As illustrated in FIG. 9, the coupling pin 121 is a member which couples the bearing housing 22 and the outer ring 31 to each other while forming a clearance for circulating a lubricating oil between the outer ring 31 and the annular part 22a. The coupling pin 121 is formed in a rod-like shape elongated in the longitudinal direction and arranged with the longitudinal direction aligned with the vertical direction.

An inner coupling hole 111 for inserting the coupling pin 121 vertically penetrates the bearing housing 22. The inner coupling hole 111 penetrates the bearing housing 22 from the outer peripheral face to the outer peripheral face through the inside thereof. A pair of inner coupling holes 111 are formed on both horizontal sides of the bearing housing 22 having an annular shape across the rotary shaft 5. Thus, the pair of inner coupling holes 111 are arranged in parallel to each other.

An outer coupling hole 112 for inserting the coupling pin 121 vertically penetrates the outer ring 31. The outer coupling hole 112 penetrates the outer ring 31 from the outer peripheral face to the inner peripheral face as well as from the inner peripheral face to the outer peripheral face. That is, two outer coupling holes 112 are formed continuously in the vertical direction. When the two outer coupling holes 112 continuous in the vertical direction are defined as one set, a pair of two sets of outer coupling holes 112 are formed on both horizontal sides of the outer ring 31 having an annular shape across the rotary shaft 5. Thus, the pair of outer coupling holes 112 are arranged in parallel to each other.

The one set of outer coupling holes 112 and the inner coupling hole 111 vertically overlap each other and have circular cross sections. The inner coupling hole 111 and the outer coupling hole 112 have the same inside diameter. In this case, the inner coupling hole 111 is arranged between the one set of outer coupling holes 112 in the vertical direction.

The outer ring 31 includes a housing part 113 which is formed on the radially outer side of the outer coupling hole 112 and houses a longitudinal end of the coupling pin 121. A stopper member 128 (described below) abuts against the housing part 113 to restrict the position of the coupling pin 121.

As illustrated in FIGS. 10 and 11, a plurality of inner coupling holes 111 are formed at predetermined intervals along the axial direction of the rotary shaft 5, and a plurality of sets of outer coupling holes 112 are formed at predetermined intervals along the axial direction of the rotary shaft 5. In FIGS. 10 and 11, the pad 21 and the rotary shaft disposed inside the bearing housing 22 are not illustrated.

Again referring to FIG. 9, the rod-like coupling pin 121 is inserted into one of the outer coupling holes 112 of the outer ring 31, then inserted into the inner coupling hole 111 of the bearing housing 22, and then inserted into the other outer coupling hole 112 of the outer ring 31. The coupling pin 121 includes a pair of outer fitting parts 126 which are formed on both longitudinal ends, an inner fitting part 125 which is formed between the pair of outer fitting parts 126, and a pair of deformable damper parts 127 each of which is formed between the corresponding outer fitting part 126 and the inner fitting part 125.

As illustrated in FIG. 10, the pair of outer fitting parts 126 are fitted with the pair of outer coupling holes 112. Thus, each of the outer fitting parts 126 is formed in a cylindrical shape having a diameter substantially equal to the inside diameter of each of the outer coupling holes 112 so as to be fitted with each of the outer coupling holes 112 having a circular cross-sectional shape. As illustrated in FIG. 9, a longitudinal end of each of the outer fitting parts 126 projects from the outer coupling hole 112. The stopper member 128 for restricting the position of the coupling pin 121 is disposed on the projecting end of the outer fitting part 126. The stopper member 128 is inserted into a through hole which penetrates the outer fitting part 126 in the radial direction and abuts against the housing part 113 in this state to prevent the coupling pin 121 from coming off.

As illustrated in FIG. 11, the inner fitting part 125 is fitted with the inner coupling hole 111. Thus, the inner fitting part 125 is formed in a cylindrical shape having a diameter substantially equal to the inside diameter of the inner coupling hole 111 so as to be fitted with the inner coupling hole 111 having a circular cross-sectional shape.

As illustrated in FIG. 9, the pair of deformable damper parts 127 are formed between one of the outer fitting parts 126 and the inner fitting part 125 and between the other outer fitting part 126 and the inner fitting part 125, and inserted throughout the inner coupling hole 111 and the outer coupling holes 112. Each of the deformable damper parts 127 is deformable in response to relative deformation in the radial direction between the outer ring 31 and the bearing housing 22. The deformable damper part 127 is formed in a cylindrical shape having a diameter smaller than the inside diameter of the inner coupling hole 111 and the inside diameter of the outer coupling hole 112.

As described above, the configuration of the third embodiment enables the length of the coupling pin 121 to be increased in the vertical direction by arranging the coupling pin 121 along the vertical direction (load direction). Accordingly, the stiffness of the deformable damper part 127 of the coupling pin 121 can be made higher in the vertical direction than in the horizontal direction. Thus, the stiffness of the coupling pin 121 can be made lower in the horizontal direction than in the vertical direction merely by changing the arrangement of the coupling pin 121 without changing the shape of the coupling pin 121.

Fourth Embodiment

Figure 12:
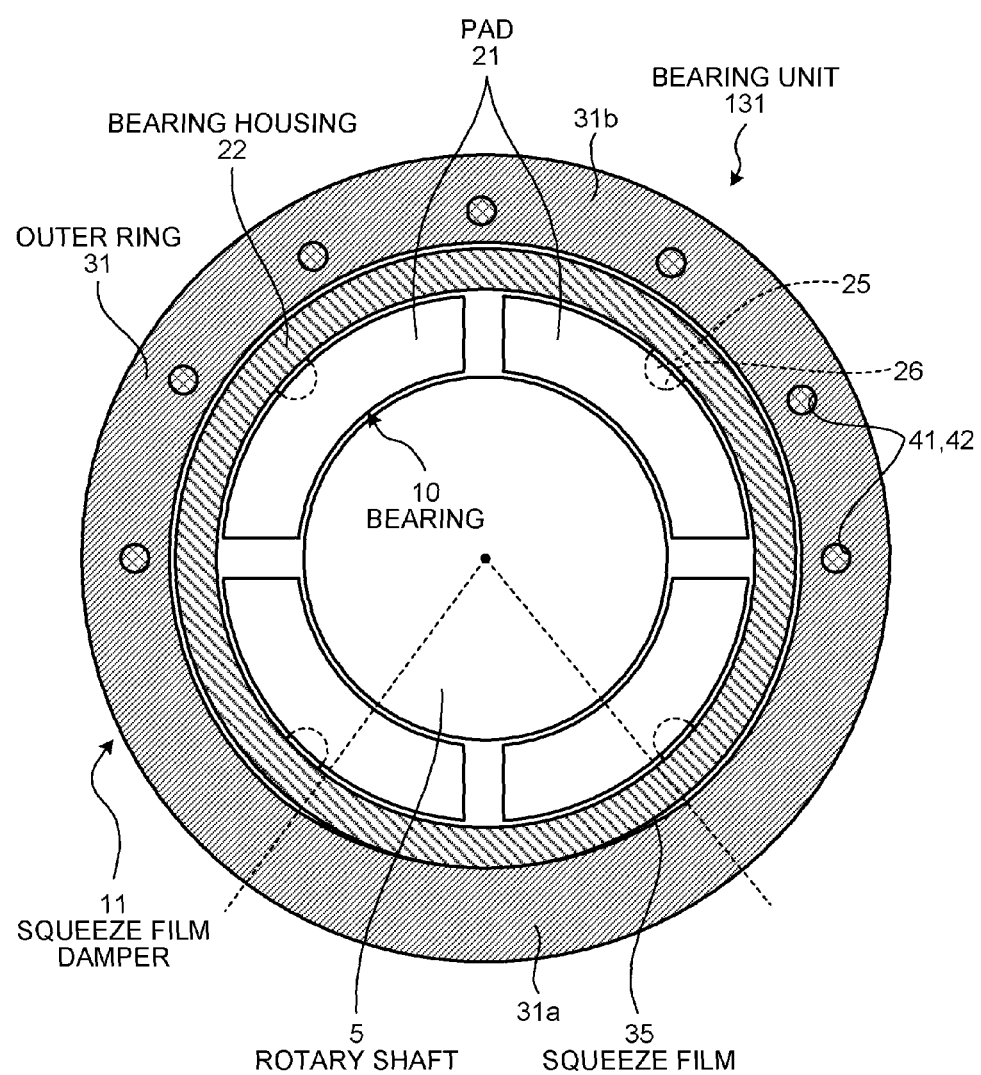
FIG. 12 is a sectional view of a bearing unit provided with a squeeze film damper according to a fourth embodiment, the view being taken along a plane perpendicular to an axial direction.

Next, a bearing unit 131 according to a fourth embodiment will be described with reference to FIG. 12. FIG. 12 is a sectional view of the bearing unit provided with a squeeze film damper according to the fourth embodiment, the view being taken along a plane perpendicular to an axial direction. Also in the fourth embodiment, parts different from the first to third embodiments will be described and parts having the same configuration as the first to third embodiments will be designated by the same reference signs to avoid overlapping description. In the bearing unit 131 of the fourth embodiment, a bearing housing 22 and an outer ring 31 are brought into contact with each other at the lower side in the vertical direction.

As illustrated in FIG. 12, in the bearing unit 131 of the fourth embodiment, the inner peripheral face of a region 31a located on the lower side in the vertical direction of the outer ring 31 and the inner peripheral face of a region 31b other than the lower side in the vertical direction have different curvature radii. Specifically, the inner peripheral face of the lower side region 31a has a larger curvature radius than the inner peripheral face of the region 31b other than the lower side. The lower side region 31a is formed on the lower side in the vertical direction within a range extending over a predetermined angle around the rotary shaft 5. The lower side region 31a formed in this manner projects toward the bearing housing 22 so that the inner peripheral face on the lower side of the outer ring 31 comes into contact with the outer peripheral face on the lower side of the bearing housing 22.

A coupling pin 32 which couples the bearing housing 22 and the outer ring 31 to each other is formed in a rod-like shape elongated in the longitudinal direction and arranged with the longitudinal direction aligned with the axial direction of the rotary shaft 5. A plurality of coupling pins 32 are disposed at predetermined intervals along the circumferential direction of the outer ring 31. In this case, the number of coupling pins 32 located on the lower side in the vertical direction is smaller than the number of coupling pins 32 located on the upper side in the vertical direction. Specifically, no coupling pin 32 is disposed on the lower half part in the vertical direction of the outer ring 31, and, on the other hand, the plurality of coupling pins 32 are disposed on the upper half part in the vertical direction of the outer ring 31.

As described above, in the fourth embodiment, even when the coupling pin 32 is long, the contact between the bearing housing 22 and the outer ring 31 at the lower side in the vertical direction makes it possible to restrict the deformation of the squeeze film damper 11 at the lower side in the vertical direction and increase the stiffness at the lower side in the vertical direction. On the other hand, the stiffness of the squeeze film damper 11 is lower in the horizontal direction than in the vertical direction. In this case, in the horizontal direction, since a clearance between the bearing housing 22 and the outer ring 31 is not narrowed by a load, the clearance between the bearing housing 22 and the outer ring 31 can be appropriately maintained. Thus, the damper effect by the squeeze film 35 can be appropriately exhibited in the horizontal direction.

In the fourth embodiment, since the bearing housing 22 and the outer ring 31 are in contact with each other at the lower side in the vertical direction, the load of the bearing housing 22 is supported by the outer ring 31. Thus, since the stiffness at the lower side in the vertical direction can be increased, the number of coupling pins 32 disposed on the lower side in the vertical direction can be reduced. Thus, the number of coupling pins 32 can be reduced, which enables a reduction in the processing cost.

Although, in the fourth embodiment, the inner peripheral face of the outer ring 31 projects toward the bearing housing 22 so as to come into contact with the bearing housing 22, the present invention is not limited to this configuration. For example, the outer peripheral face of the bearing housing 22 may project toward the outer ring 31 so as to come into contact with the inner peripheral face of the outer ring 31.

Fifth Embodiment

Figure 13:
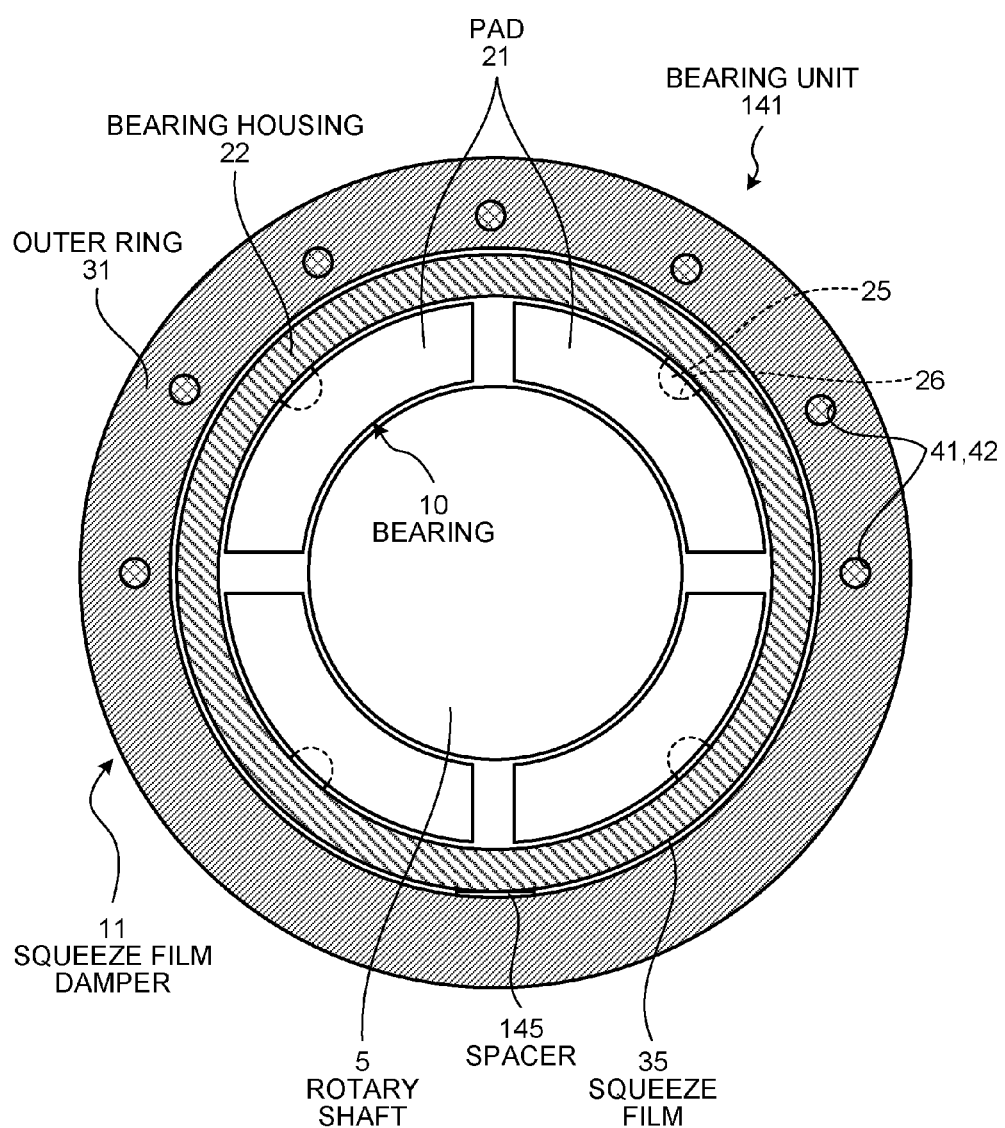
FIG. 13 is a sectional view of a bearing unit provided with a squeeze film damper according to a fifth embodiment, the view being taken along a plane perpendicular to an axial direction.

Next, a bearing unit 141 according to a fifth embodiment will be described with reference to FIG. 13. FIG. 13 is a sectional view of the bearing unit provided with a squeeze film damper according to the fifth embodiment, the view being taken along a plane perpendicular to an axial direction. Also in the fifth embodiment, parts different from the first to fourth embodiments will be described and parts having the same configuration as the first to fourth embodiments will be designated by the same reference signs to avoid overlapping description. In the bearing unit 141 of the fifth embodiment, a spacer 145 is disposed between a bearing housing 22 and an outer ring 31.

As illustrated in FIG. 13, in the bearing unit 141 of the fifth embodiment, the spacer 145 is disposed between the bearing housing 22 and the outer ring 31 at the lower side in the vertical direction. Specifically, the spacer 145 is laid on the inner peripheral face of the outer ring 31 at the lower side in the vertical direction so as to be attached to the inner peripheral face of the outer ring 31. The lower side in the vertical direction of the spacer 145 is in contact with the inner peripheral face of the outer ring 31, and the upper side in the vertical direction thereof is in contact with the outer peripheral face of the bearing housing 22. Thus, the bearing housing 22 and the outer ring 31 are in contact with each other with the spacer 145 interposed therebetween.

A coupling pin 32 which couples the bearing housing 22 and the outer ring 31 to each other is formed in a rod-like shape elongated in the longitudinal direction and arranged with the longitudinal direction aligned with the axial direction of the rotary shaft 5. A plurality of coupling pins 32 are disposed at predetermined intervals along the circumferential direction of the outer ring 31. In this case, the number of coupling pins 32 located at the lower side in the vertical direction is smaller than the number of coupling pins 32 located on the upper side in the vertical direction. Specifically, no coupling pin 32 is disposed on the lower half part in the vertical direction of the outer ring 31, and, on the other hand, the plurality of coupling pins 32 are disposed on the upper half part in the vertical direction of the outer ring 31.

As described above, in the fifth embodiment, even when the coupling pin 32 is long, the contact between the bearing housing 22 and the outer ring 31 with the spacer 145 interposed therebetween at the lower side in the vertical direction makes it possible to restrict the deformation of the squeeze film damper 11 at the lower side in the vertical direction and increase the stiffness at the lower side in the vertical direction. On the other hand, the stiffness of the squeeze film damper 11 is lower in the horizontal direction than in the vertical direction. In this case, in the horizontal direction, since a clearance between the bearing housing 22 and the outer ring 31 is not narrowed by a load, the clearance between the bearing housing 22 and the outer ring 31 can be appropriately maintained. Thus, the damper effect by the squeeze film 35 can be appropriately exhibited in the horizontal direction.

In the fifth embodiment, since the bearing housing 22 and the outer ring 31 are in contact with each other with the spacer 145 interposed therebetween at the lower side in the vertical direction, the load of the bearing housing 22 is supported by the outer ring 31. Thus, since the stiffness at the lower side in the vertical direction can be increased, the number of coupling pins 32 disposed on the lower side in the vertical direction can be reduced. Accordingly, the number of coupling pins 32 can be reduced, which enables a reduction in the processing cost.

In the fifth embodiment, laying the spacer 145 on the inner peripheral face of the outer ring 31 enables easy installation of the spacer 145. Thus, the processing cost can be reduced.

Although, in the fifth embodiment, the spacer 145 is attached to the inner peripheral face of the outer ring 31, the present invention is not limited to this configuration. The spacer 145 may be attached to the outer peripheral face of the bearing housing 22.

Figure 14:
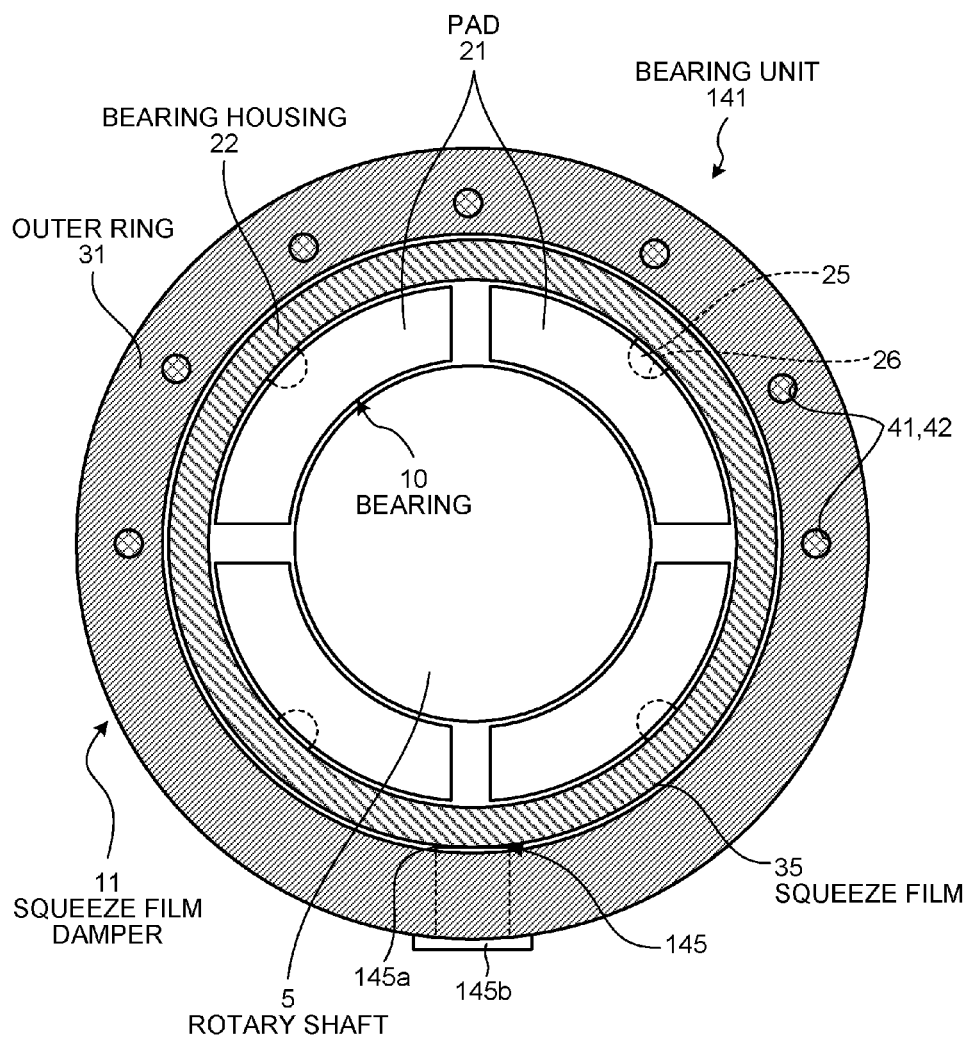
FIG. 14 is a sectional view of a bearing unit provided with a squeeze film damper according to a third modification, the view being taken along a plane perpendicular to an axial direction.

Although, in the fifth embodiment, the spacer 145 is laid on the inner peripheral face of the outer ring 31 at the lower side in the vertical direction between the bearing housing 22 and the outer ring 31, a configuration of a third modification illustrated in FIG. 14 may be employed. FIG. 14 is a sectional view of a bearing unit provided with a squeeze film damper according to the third modification, the view being taken along a plane perpendicular to an axial direction. In the third modification illustrated in FIG. 14, a spacer 145 is disposed in a manner to penetrate the outer ring 31 from the radially outer side through the radially inner side thereof.

As illustrated in FIG. 14, in the bearing unit 141 of the third modification, the spacer 145 is disposed between the bearing housing 22 and the outer ring 31 at the lower side in the vertical direction. The spacer 145 includes a spacer body 145a and a fixation part 145b. The spacer body 145a extends from the outer peripheral face through the inner peripheral face of the outer ring 31. A spacer through hole penetrates the outer ring 31, and the spacer body 145a is inserted into the spacer through hole.

The fixation part 145b is disposed on the spacer body 145a at a side corresponding to the outer ring 31 (the lower side in the vertical direction) and attached to the outer peripheral face of the outer ring 31. The fixation part 145b is attached to the outer peripheral face of the outer ring 31 to fix the spacer body 145a. The fixed spacer body 145a projects from the inner peripheral face of the outer ring 31 and comes into contact with the outer peripheral face of the bearing housing 22.

As described above, in the third modification, the spacer 145 can be disposed in a manner to penetrate the outer ring 31. Thus, it is possible to easily install the spacer 145 and reduce the processing cost.

Sixth Embodiment

Figure 15:
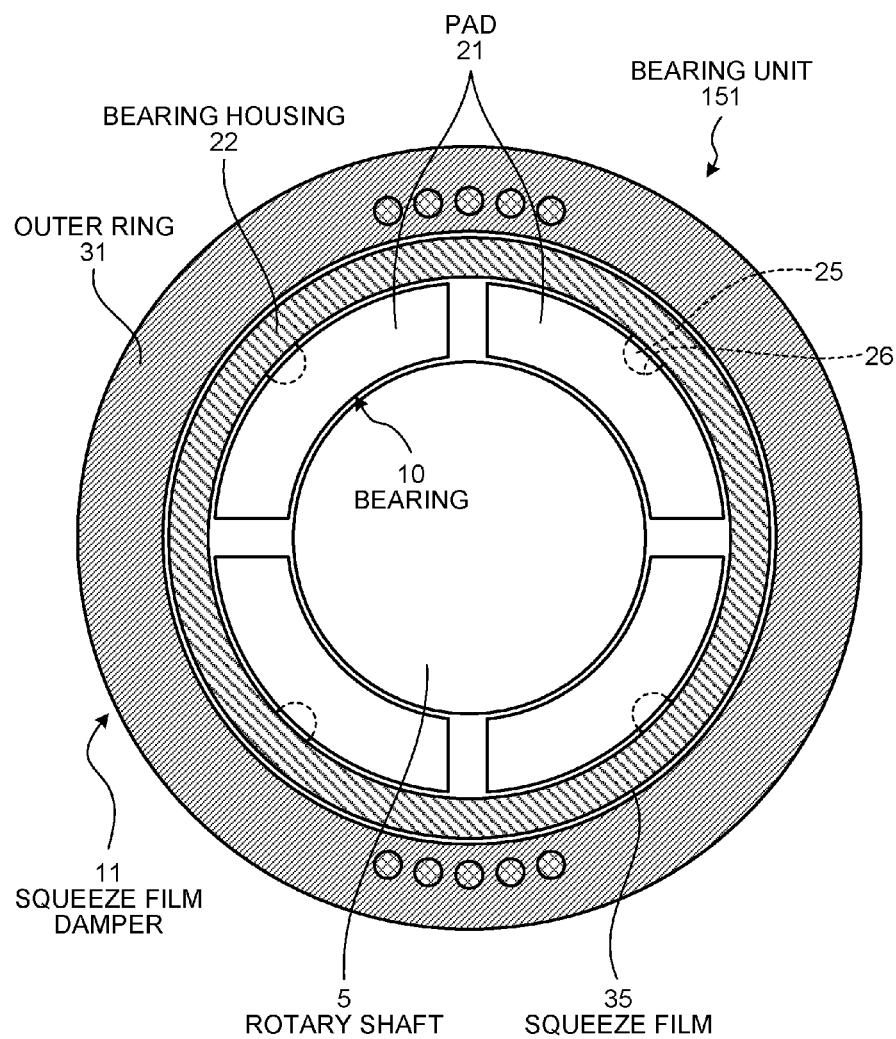
FIG. 15 is a sectional view of a bearing unit provided with a squeeze film damper according to a sixth embodiment, the view being taken along a plane perpendicular to an axial direction.

Next, a bearing unit 151 according to a sixth embodiment will be described with reference to FIG. 15. FIG. 15 is a sectional view of the bearing unit provided with a squeeze film damper according to the sixth embodiment, the view being taken along a plane perpendicular to an axial direction. Also in the sixth embodiment, parts different from the first to fifth embodiments will be described and parts having the same configuration as the first to fifth embodiments will be designated by the same reference signs to avoid overlapping description. In the bearing unit 151 of the sixth embodiment, a plurality of coupling pins 32 are arranged on both vertical sides.

As illustrated in FIG. 15, in the bearing unit 151 of the sixth embodiment, a coupling pin 32 which couples the bearing housing 22 and the outer ring 31 to each other is formed in a rod-like shape elongated in the longitudinal direction and arranged with the longitudinal direction aligned with the axial direction of the rotary shaft 5. A plurality of coupling pins 32 are disposed at predetermined intervals along the circumferential direction of the outer ring 31. The intervals between the plurality of coupling pins 32 in the circumferential direction are shorter on both vertical sides (the upper side and the lower side) and longer on both horizontal sides (the left side and the right side). Thus, the plurality of coupling pins 32 are arranged with small intervals on the upper side and the lower side in the vertical direction and, on the other hand, with large intervals on the left side and the right side in the horizontal direction.

As described above, in the sixth embodiment, since the intervals between the coupling pins 32 are reduced on both vertical sides and, on the other hand, the intervals between the coupling pins 32 are expanded on both horizontal sides, the stiffness of the plurality of coupling pins 32 can be made higher in the vertical direction than in the horizontal direction. Thus, the arrangement of the plurality of coupling pins 32 enables the squeeze film damper 11 to have appropriate stiffness.

Seventh Embodiment

Figure 16:
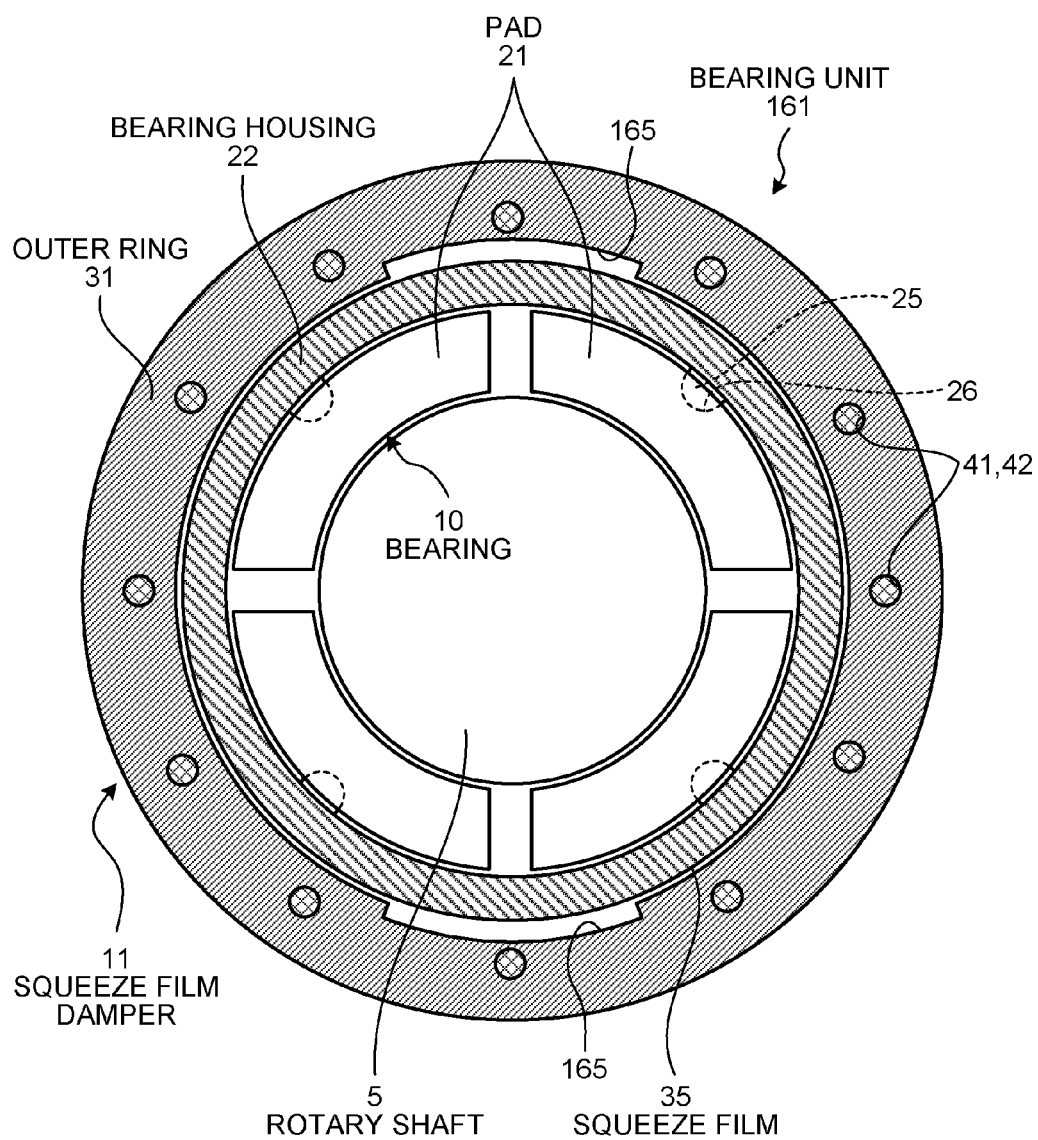
FIG. 16 is a sectional view of a bearing unit provided with a squeeze film damper according to a seventh embodiment, the view being taken along a plane perpendicular to an axial direction.

Next, a bearing unit 161 according to a seventh embodiment will be described with reference to FIG. 16. FIG. 16 is a sectional view of the bearing unit provided with a squeeze film damper according to the seventh embodiment, the view being taken along a plane perpendicular to an axial direction. Also in the seventh embodiment, parts different from the first to sixth embodiments will be described and parts having the same configuration as the first to sixth embodiments will be designated by the same reference signs to avoid overlapping description. In the bearing unit 161 of the seventh embodiment, a groove 165 is formed on the inner peripheral face of an outer ring 31.

As illustrated in FIG. 16, in the bearing unit 161 of the seventh embodiment, the groove 165 is formed on the inner peripheral face of the outer ring 31 at the lower side in the vertical direction. The groove 165 is recessed from the inner peripheral face of the outer ring 31. The groove 165 is formed along the inner peripheral face of the outer ring 31 with a predetermined depth. The groove 165 is formed within a range extending over a predetermined angle around the rotary shaft 5 at either side in the vertical direction. Grooves 165 are formed on both vertical sides (the upper side and the lower side). Thus, a clearance between the bearing housing 22 and the outer ring 31 is larger on both vertical sides than on both horizontal sides.

As described above, in the seventh embodiment, even when the coupling pin 32 is long, the clearance between the bearing housing 22 and the outer ring 31 is not narrowed on both vertical sides. Thus, the clearance between the bearing housing 22 and the outer ring 31 can be appropriately maintained on both vertical sides, which enables a deterioration in the damper effect by the squeeze film 35 to be reduced. On the other hand, in the horizontal direction, since the clearance between the bearing housing 22 and the outer ring 31 is not narrowed by a load, the clearance between the bearing housing 22 and the outer ring 31 can be appropriately maintained. Thus, the damper effect by the squeeze film can be appropriately exhibited in the horizontal direction.

In the seventh embodiment, forming the grooves 165 makes it possible to easily ensure the clearance between the bearing housing 22 and the outer ring 31 on both vertical sides and reduce the processing cost.

Although, in the seventh embodiment, the grooves 165 are formed on the inner peripheral face of the outer ring 31, the position of the grooves 165 is not particularly limited to any position. The grooves 165 may be formed on the outer peripheral face of the bearing housing 22, or may be formed on both the inner peripheral face of the outer ring 31 and the outer peripheral face of the bearing housing 22.

Eighth Embodiment

Figure 17:
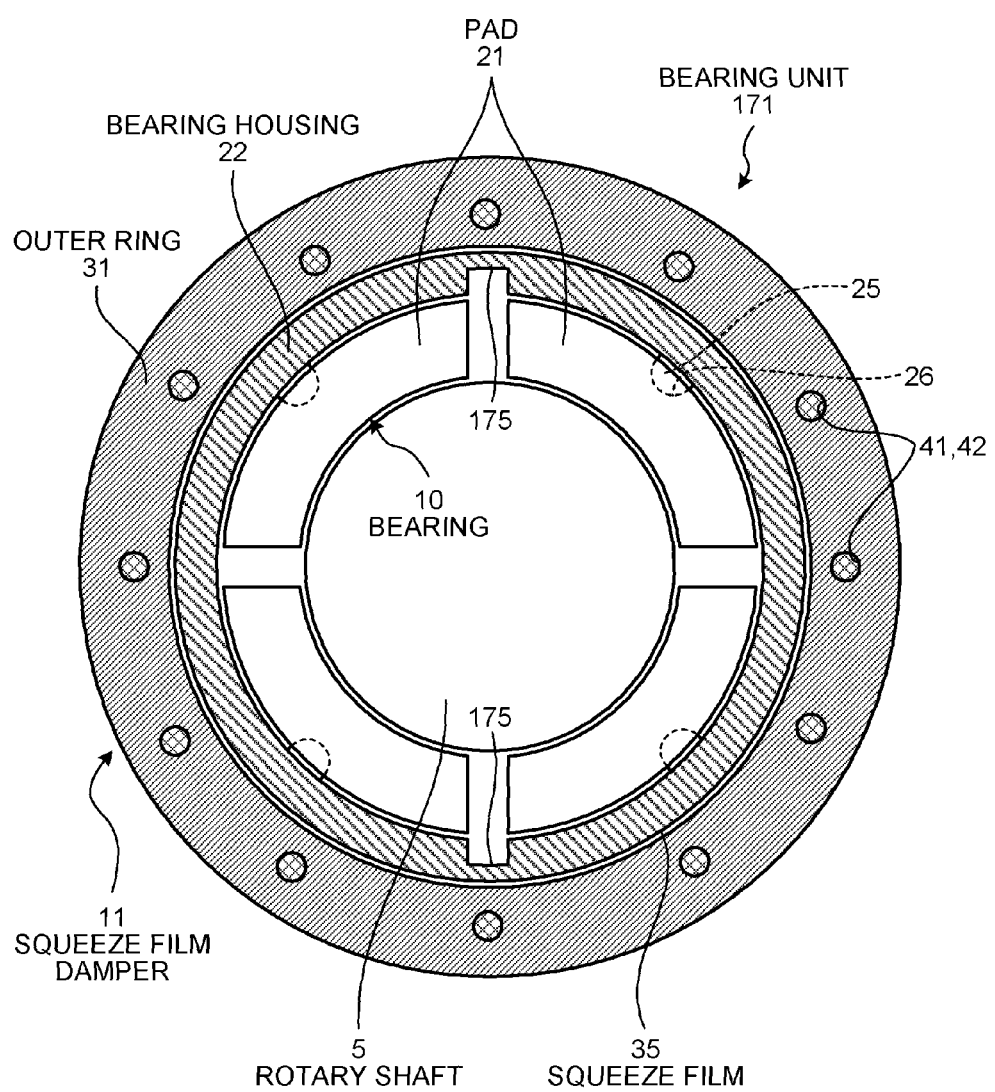
FIG. 17 is a sectional view of a bearing unit provided with a squeeze film damper according to an eighth embodiment, the view being taken along a plane perpendicular to an axial direction.

Next, a bearing unit 171 according to an eighth embodiment will be described with reference to FIG. 17. FIG. 17 is a sectional view of the bearing unit provided with a squeeze film damper according to the eighth embodiment, the view being taken along a plane perpendicular to an axial direction. Also in the eighth embodiment, parts different from the first to seventh embodiments will be described and parts having the same configuration as the first to seventh embodiments will be designated by the same reference signs to avoid overlapping description. In the bearing unit 171 of the eighth embodiment, a cut-away part 175 is formed on the inner peripheral face of a bearing housing 22.

As illustrated in FIG. 17, in the bearing unit 171 of the eighth embodiment, the cut-away part 175 is formed on the inner peripheral face of the bearing housing 22 at the lower side in the vertical direction. The cut-away part 175 is recessed from the inner peripheral face of the bearing housing 22. The cut-away part 175 is formed on the bearing housing 22 in a cut-away manner with a predetermined depth. The cut-away parts 175 are formed on both vertical sides (the upper side and the lower side). Thus, the stiffness of the bearing housing 22 is higher in the vertical direction than in the horizontal direction.

As described above, in the eighth embodiment, the bearing housing 22 is more resistant to deformation in the vertical direction than in the horizontal direction. Thus, in the vertical direction, since a clearance between the bearing housing 22 and the outer ring 31 can be appropriately maintained, a deterioration in the damper effect by the squeeze film 35 can be reduced. Further, in the horizontal direction, since the clearance between the bearing housing 22 and the outer ring 31 is not narrowed by a load, the clearance between the bearing housing 22 and the outer ring 31 can be appropriately maintained. Thus, the damper effect by the squeeze film 35 can be appropriately exhibited in the horizontal direction.

In the eighth embodiment, forming the cut-away parts 175 on both vertical sides of the bearing housing 22 makes it possible to easily reduce the stiffness of the bearing housing 22 in the horizontal direction and relatively increase the stiffness of the bearing housing 22 in the vertical direction. Thus, the processing cost can be reduced.

Although, in the eighth embodiment, the cut-away parts 175 are formed on the inner peripheral face of the bearing housing 22, the position of the cut-away parts 175 is not particularly limited to any position. The cut-away parts 175 may be formed on the outer peripheral face of the bearing housing 22, or may be formed on both the inner peripheral face and the outer peripheral face of the bearing housing 22.

REFERENCE SIGNS LIST

1 BEARING UNIT
5 ROTARY SHAFT
6 TURBINE
10 BEARING
11 SQUEEZE FILM DAMPER
21 PAD
22 BEARING HOUSING
22a ANNULAR PART
22b INNER PERIPHERAL FLANGE
22c OUTER PERIPHERAL FLANGE
31 OUTER RING
32 COUPLING PIN
35 SQUEEZE FILM
41 INNER COUPLING HOLE
42 OUTER COUPLING HOLE
51 INNER FITTING PART
52 OUTER FITTING PART
53 DEFORMABLE DAMPER PART
71 COUPLING PIN (SECOND EMBODIMENT)
73 DEFORMABLE DAMPER PART (SECOND EMBODIMENT)
101 BEARING UNIT (THIRD EMBODIMENT)
121 COUPLING PIN (THIRD EMBODIMENT)
111 INNER COUPLING HOLE (THIRD EMBODIMENT)
112 OUTER COUPLING HOLE (THIRD EMBODIMENT)
113 HOUSING PART
125 INNER FITTING PART (THIRD EMBODIMENT)
126 OUTER FITTING PART (THIRD EMBODIMENT)
127 DEFORMABLE DAMPER PART (THIRD EMBODIMENT)
128 STOPPER MEMBER
131 BEARING UNIT (FOURTH EMBODIMENT)
141 BEARING UNIT (FIFTH EMBODIMENT)
145 SPACER
151 BEARING UNIT (SIXTH EMBODIMENT)
161 BEARING UNIT (SEVENTH EMBODIMENT)
165 GROOVE
171 BEARING UNIT (EIGHTH EMBODIMENT)
175 CUT-AWAY PART

The invention claimed is:
1. A squeeze film damper comprising:
an inner ring disposed around a radially outer side of a bearing, the bearing rotatably supporting a rotary shaft;
an outer ring disposed around a radially outer side of the inner ring;
a squeeze film formed by circulating a viscous fluid through a clearance in a radial direction between the inner ring and the outer ring; and
a coupling member configured to couple the inner ring and the outer ring to each other, the coupling member being deformable in response to relative displacement in the radial direction between the outer ring and the inner ring,
wherein the coupling member has stiffness that is higher in a load direction than in a perpendicular direction perpendicular to the load direction in a cross section perpendicular to an axial direction, or wherein the inner ring and the outer ring are arranged in contact with each other at a load direction side in a cross section perpendicular to an axial direction, or wherein further comprising a spacer disposed between the inner ring and the outer ring at a load direction side, the spacer being in contact with an outer peripheral face of the inner ring and one of an inner peripheral face of the outer ring and an outer peripheral face of the outer ring, and attached to the inner ring or the outer ring.

2. The squeeze film damper according to claim 1, wherein
when the coupling member has stiffness that is higher in a load direction than in a perpendicular direction perpendicular to the load direction in a cross section perpendicular to an axial direction, the inner ring and the outer ring each have overlap parts overlapping each other in the axial direction, the coupling member is disposed along an axial direction and couples the overlap part of the inner ring and the overlap part of the outer ring to each other, a part of the coupling member serves as a deformable damper part deformable in response to the displacement, and the deformable damper part has stiffness that is higher in the load direction than in the perpendicular direction perpendicular to the load direction in the cross section perpendicular to the axial direction.

3. The squeeze film damper according to claim 2, wherein the deformable damper part has a cross-sectional shape that is long in the load direction and short in the perpendicular direction in the cross section.

4. The squeeze film damper according to claim 2, wherein
the overlap part of the inner ring includes an inner coupling hole into which the coupling member is inserted, the overlap part of the outer ring includes an outer coupling hole into which the coupling member is inserted, the coupling member includes
an inner fitting part fitted with the inner coupling hole,
an outer fitting part fitted with the outer coupling hole, and
the deformable damper part formed between the inner fitting part and the outer fitting part and housed in the outer coupling hole, and the deformable damper part abuts against an inner face of the outer coupling hole at a side in the load direction.

5. The squeeze film damper according to claim 1, wherein
when the coupling member has stiffness that is higher in a load direction than in a perpendicular direction perpendicular to the load direction in a cross section perpendicular to an axial direction, the inner ring and the outer ring each have overlap parts overlapping each other in a load direction, the coupling member is disposed along the load direction and couples the overlap part of the inner ring and the overlap part of the outer ring to each other, and a part of the coupling member serves as a deformable damper part deformable in response to the displacement.

6. The squeeze film damper according to claim 1, wherein
when the coupling member has stiffness that is higher in a load direction than in a perpendicular direction perpendicular to the load direction in a cross section perpendicular to an axial direction, a plurality of the coupling members are disposed along an axial direction at predetermined intervals in a circumferential direction of the rotary shaft, and the intervals in the circumferential direction of the plurality of coupling members are short on both sides in the load direction and long on both sides in the perpendicular direction.

7. The squeeze film damper according to claim 1, wherein
when the inner ring and the outer ring are arranged in contact with each other at a load direction side in a cross section perpendicular to an axial direction, the outer ring has an inner peripheral face facing the inner ring, the inner peripheral face being in contact with an outer peripheral face of the inner ring at the load direction side, and the inner peripheral face of the outer ring has a curvature radius that is larger in a region located at the load direction side than in a region other than the load direction side in a cross section perpendicular to the axial direction.

8. The squeeze film damper according to claim 1, wherein
when further comprising a spacer disposed between the inner ring and the outer ring at a load direction side, the spacer being in contact with the outer peripheral face of the inner ring and the inner peripheral face of the outer ring, the spacer is laid on an inner peripheral face of the outer ring, the inner peripheral face facing the inner ring.

9. The squeeze film damper according to claim 1, wherein
when further comprising a spacer disposed between the inner ring and the outer ring at a load direction side, the spacer being in contact with the outer peripheral face of the inner ring and the outer peripheral face of the outer ring, the spacer penetrates the outer ring from a radially outer side through a radially inner side.

10. The squeeze film damper according to claim 1, wherein
when the inner ring and the outer ring are arranged in contact with each other at a load direction side in a cross section perpendicular to an axial direction, a plurality of the coupling members are disposed along the axial direction at predetermined intervals in a circumferential direction of the rotary shaft, and the number of the plurality of coupling members is smaller at the load direction side than at an opposite side of the load direction side.

11. The squeeze film damper according to claim 1, wherein
the bearing is a tilting pad bearing including
a plurality of pads disposed around the rotary shaft at predetermined intervals, and
a bearing housing configured to hold the plurality of pads, the bearing housing being disposed around radially outer sides of the plurality of pads, and the bearing housing and the inner ring are integrated with each other.

12. A bearing unit comprising:
a bearing configured to rotatably support a rotary shaft; and
the squeeze film damper according to claim 1 disposed around a radially outer side of the bearing.

13. A turbine comprising:
the bearing unit according to claim 12; and
the rotary shaft rotatably supported by the bearing unit.

14. A squeeze film damper comprising:
an inner ring disposed around a radially outer side of a bearing, the bearing rotatably supporting a rotary shaft;

an outer ring disposed around a radially outer side of the inner ring;

a squeeze film formed by circulating a viscous fluid through a clearance in a radial direction between the inner ring and the outer ring; and a coupling member configured to couple the inner ring and the outer ring to each other, the coupling member being deformable in response to relative displacement in the radial direction between the outer ring and the inner ring, wherein the clearance between the inner ring and the outer ring is larger in a load direction than in a perpendicular direction perpendicular to the load direction in a cross section perpendicular to an axial direction.

15. The squeeze film damper according to claim 14, wherein the outer ring includes grooves formed in a recessed form on an inner peripheral face facing the inner ring, and the grooves are formed on both sides in the load direction in the cross section perpendicular to the axial direction.

16. A squeeze film damper comprising:

an inner ring disposed around a radially outer side of a bearing, the bearing rotatably supporting a rotary shaft;

an outer ring disposed around a radially outer side of the inner ring;

a squeeze film formed by circulating a viscous fluid through a clearance in a radial direction between the inner ring and the outer ring; and a coupling member configured to couple the inner ring and the outer ring to each other, the coupling member being deformable in response to relative displacement in the radial direction between the outer ring and the inner ring, wherein the inner ring has stiffness that is higher in a load direction than in a perpendicular direction perpendicular to the load direction in a cross section perpendicular to an axial direction.

17. The squeeze film damper according to claim 16, wherein the inner ring includes cut-away parts formed on both sides in the load direction.

* * * * *